US010519254B2

(12) United States Patent
Kyo et al.

(10) Patent No.: US 10,519,254 B2
(45) Date of Patent: Dec. 31, 2019

(54) MODIFIED CONJUGATED DIENE-BASED POLYMER AND PRODUCTION METHOD THEREFOR, RUBBER COMPOSITION AND TIRE

(71) Applicant: Asahi Kasei Kabushiki Kaisha, Tokyo (JP)

(72) Inventors: Miki Kyo, Tokyo (JP); Shinichi Sekikawa, Tokyo (JP); Hiromi Nakafutami, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 128 days.

(21) Appl. No.: 15/551,711

(22) PCT Filed: Feb. 18, 2016

(86) PCT No.: PCT/JP2016/054687
§ 371 (c)(1),
(2) Date: Aug. 17, 2017

(87) PCT Pub. No.: WO2016/133154
PCT Pub. Date: Aug. 25, 2016

(65) Prior Publication Data
US 2018/0066076 A1 Mar. 8, 2018

(30) Foreign Application Priority Data
Feb. 19, 2015 (JP) ................. 2015-031098

(51) Int. Cl.
C08F 36/14 (2006.01)
C08C 19/25 (2006.01)
C08L 15/00 (2006.01)
C08K 3/013 (2018.01)
B60C 1/00 (2006.01)

(52) U.S. Cl.
CPC ........... C08C 19/25 (2013.01); B60C 1/00 (2013.01); B60C 1/0016 (2013.01); C08K 3/013 (2018.01); C08L 15/00 (2013.01)

(58) Field of Classification Search
None
See application file for complete search history.

(56) References Cited

U.S. PATENT DOCUMENTS

2003/0199669 A1 10/2003 Saito et al.
2006/0173138 A1 8/2006 Hogan et al.
2009/0118498 A1 5/2009 Subramaniam et al.
2013/0023624 A1 1/2013 Sekikawa et al.
2013/0085228 A1* 4/2013 Tanaka ............... C08C 19/25
524/572
2014/0371372 A1 12/2014 Hirayama
2015/0045474 A1 2/2015 Lee et al.
2015/0376321 A1 12/2015 Lee et al.
2018/0066076 A1* 3/2018 Kyo .................... B60C 1/00

FOREIGN PATENT DOCUMENTS

| EP | 1942120 A1 * | 7/2008 | ............ C08C 19/44 |
| EP | 2003146 A1 * | 12/2008 | ............ C08L 15/00 |
| EP | 2003146 A2 | 12/2008 | |
| EP | 2754674 A1 | 7/2014 | |
| EP | 2813523 A1 * | 12/2014 | ............ C08F 236/10 |
| EP | 2826793 A1 | 1/2015 | |
| EP | 2853547 A1 | 4/2015 | |
| JP | H11-189616 A | 7/1999 | |
| JP | 2003-171418 A | 6/2003 | |
| JP | 2005-290355 A | 10/2005 | |
| JP | 2008-527150 A | 7/2008 | |
| JP | 2008285558 A * | 11/2008 | |
| JP | WO2007/114203 A1 | 8/2009 | |
| JP | 2009-263537 A | 11/2009 | |
| JP | 2013-082843 A | 5/2013 | |
| JP | WO2011/129425 A1 | 7/2013 | |
| JP | 2014-131955 A | 7/2014 | |
| JP | 2014-177517 A | 9/2014 | |
| JP | 2015-131955 A | 7/2015 | |
| JP | 2015-518516 A | 7/2015 | |
| JP | WO2013/125614 A1 | 7/2015 | |
| JP | 2016-079217 A | 5/2016 | |
| JP | 2018-016814 A | 2/2018 | |
| JP | 2019-002028 A | 1/2019 | |
| WO | 2001/023467 A1 | 4/2001 | |
| WO | 07114203 A1 † | 10/2007 | |
| WO | WO-2013031599 A1 * | 3/2013 | ............ C08K 3/36 |
| WO | 2014/175561 A1 | 10/2014 | |
| WO | 2015/016405 A1 | 2/2015 | |
| WO | 15016405 A1 † | 2/2015 | |
| WO | WO-2015016405 A1 * | 2/2015 | ............ C08F 236/10 |

OTHER PUBLICATIONS

Varian's Advanced GPC Part 2—Polymer Branching, available online no later than Nov. 17, 2014.*
International Preliminary Report on Patentability and Written Opinion issued in corresponding International Patent Application No. PCT/JP2016/054687 dated Aug. 31, 2017.
Supplementary European Search Report issued in corresponding European Patent Application No. 16752540.1 dated May 18, 2018.
Database WPI Week 201466 Thomson Scientific, 2014-R59240, XP002780909 (2014).
Database WPI Week 201335 Thomson Scientific, 2013-G94124, XP002780910 (2013).
International Search Report issued in corresponding International Patent Application No. PCT/JP2016/054687 dated Mar. 15, 2016.

* cited by examiner
† cited by third party

Primary Examiner — Vu A Nguyen
(74) Attorney, Agent, or Firm — Morgan, Lewis & Bockius LLP

(57) ABSTRACT

The present invention provides a modified conjugated diene-based polymer having a weight-average molecular weight of $20\times10^4$ or more and $300\times10^4$ or less, in which the modified conjugated diene-based polymer having a molecular weight of $200\times10^4$ or more and $500\times10^4$ or less is comprised in an amount of 0.25% by mass or more and 30% by mass or less based on a total amount of the modified conjugated diene-based polymer, and a shrinking factor (g') is less than 0.64.

18 Claims, No Drawings

MODIFIED CONJUGATED DIENE-BASED POLYMER AND PRODUCTION METHOD THEREFOR, RUBBER COMPOSITION AND TIRE

TECHNICAL FIELD

The present invention relates to a modified conjugated diene-based polymer and a production method therefor, a rubber composition and a tire.

BACKGROUND ART

Recently, there are increasing demands for reduction of fuel consumption in vehicles, and improvement of materials of a vehicle tire, particularly, of a tire tread in contact with the ground surface is required. So far, development of a material having low rolling resistance, namely, a material having a low hysteresis loss property, has been demanded. Besides, in order to reduce the weight of a tire, it is necessary to reduce the thickness of a tread portion of the tire, and there is a demand for a material having high abrasion resistance. On the other hand, a material used for a tire tread is required, from the viewpoint of safety, to be excellent in wet skid resistance and to have practically sufficient fracture characteristics.

A material meeting such requirements is a material containing a rubber and a reinforcing filler such as carbon black or silica. If, for example, a material containing silica is used, balance between the low hysteresis loss property and the wet skid resistance can be improved. Besides, an attempt has been made to reduce a hysteresis loss by improving dispersibility of silica in a material through introduction of a functional group having affinity or reactivity with silica into a molecular end of a rubber having high mobility, and further by reducing the mobility of the molecular end of the rubber through a bond with a silica particle.

For example, Patent Literature 1 proposes a modified diene-based rubber obtained by reacting a modifier having a glycidylamino group with a polymer active end. Besides, Patent Literatures 2 to 4 propose a modified diene-based rubber obtained by reacting alkoxysilanes having an amino group with a polymer active end, and a composition of such a modified diene-based rubber and silica. Furthermore, Patent Literatures 5 and 6 propose a polymer functionalized through a reaction of a cyclic aza-sila cycle compound with a polymer active end. In addition, Patent Literature 7 proposes a diene-based rubber obtained through a coupling reaction between a polymer active end and a multi-functional silane compound.

CITATION LIST

Patent Literature

[Patent Literature 1] International Publication No. WO01/23467
[Patent Literature 2] Japanese Patent Laid-Open No. 2005-290355
[Patent Literature 3] Japanese Patent Laid-Open No. 11-189616
[Patent Literature 4] Japanese Patent Laid-Open No. 2003-171418
[Patent Literature 5] National Publication of International Patent Application No. 2008-527150
[Patent Literature 6] International Publication No. WO11/129425
[Patent Literature 7] International Publication No. WO07/114203

SUMMARY OF INVENTION

Technical Problem

A material containing silica has, however, a disadvantage of being inferior in dispersibility to carbon black because it has a hydrophilic surface and hence has low affinity with a conjugated diene-based rubber while carbon black has a hydrophobic surface. Therefore, the material containing silica needs to additionally contain a silane coupling agent or the like to improve the dispersibility by imparting a bond between the silica and the rubber. Besides, the material in which a functional group having high reactivity with silica is introduced into a molecular end of the rubber tends to be degraded in workability, for example, it becomes difficult to knead because a reaction with a silica particle proceeds during a kneading process to increase the viscosity of a resultant composition, or surface coarseness or sheet breakage is easily caused when formed into a sheet after the kneading. In addition, when such a material is used to obtain a vulcanizate, in particular, used to obtain a vulcanizate containing an inorganic filler such as, in particular, silica, the balance between the low hysteresis loss property and the wet skid resistance, and the abrasion resistance are not sufficient.

Therefore, an object of the present invention is to provide a modified conjugated diene-based polymer that is excellent in workability obtained when used for obtaining a vulcanizate, excellent in balance between a low hysteresis loss property and wet skit resistance and in abrasion resistance obtained when in the form of a vulcanizate, and has practically sufficient fracture characteristics.

Solution to Problem

The present inventors made earnest studies to solve the above-described problems of the related arts, and as a result, it was found that a modified conjugated diene-based polymer having a weight-average molecular weight in a prescribed range containing a prescribed amount of the modified conjugated diene-based polymer having a molecular weight falling in a prescribed range, and having a shrinking factor (g') smaller than a prescribed value was excellent in workability obtained when used for obtaining a vulcanizate, was excellent in balance between a low hysteresis loss property and wet skit resistance and in abrasion resistance obtained when in the form of a vulcanizate, and had practically sufficient fracture characteristics, and thus, the present invention was accomplished.

Specifically, the present invention provides the following:

[1]

A modified conjugated diene-based polymer having a weight-average molecular weight of $20 \times 10^4$ or more and $300 \times 10^4$ or less, comprising:

the modified conjugated diene-based polymer having a molecular weight of $200 \times 10^4$ or more and $500 \times 10^4$ or less in an amount of 0.25% by mass or more and 30% by mass or less based on a total amount of the modified conjugated diene-based polymer, wherein a shrinking factor (g') is less than 0.64.

[2]

The modified conjugated diene-based polymer according to [1], having a nitrogen atom and a silicon atom.

[3]
The modified conjugated diene-based polymer according to [1] or [2], wherein the weight-average molecular weight is $50 \times 10^4$ or more and $150 \times 10^4$ or less.

[4]
The modified conjugated diene-based polymer according to any of [1] to [3], comprising the modified conjugated diene-based polymer having a molecular weight of $200 \times 10^4$ or more and $500 \times 10^4$ or less in an amount of 1.0% by mass or more and 30% by mass or less based on a total amount of the modified conjugated diene-based polymer.

[5]
The modified conjugated diene-based polymer according to any of [1] to [4], comprising a branch, wherein a branching degree is 5 or more.

[6]
The modified conjugated diene-based polymer according to [5], wherein the branching degree is 6 or more.

[7]
The modified conjugated diene-based polymer according to [5] or [6], having one or more of coupling residues and conjugated diene-based polymer chains bonded to the coupling residues,
wherein the branch comprises a branch in which five or more of the conjugated diene-based polymer chains are bonded to one of the coupling residues.

[8]
The modified conjugated diene-based polymer according to any of [5] to [7], wherein the branch comprises a branch in which six or more of the conjugated diene-based polymer chains are bonded to one of the coupling residues.

[9]
The modified conjugated diene-based polymer according to [7] or [8], wherein at least one silicon atom comprised in the coupling residues constitutes an alkoxysilyl group or a silanol group having 1 to 20 carbon atoms.

[10]
The modified conjugated diene-based polymer according to any of [1] to [9], represented by following general formula (I):

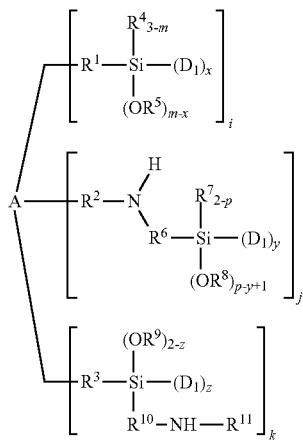

wherein $D^1$ represents a diene-based polymer chain; $R^1$ to $R^3$ each independently represent a single bond or an alkylene group having 1 to 20 carbon atoms; $R^4$ and $R^7$ each independently represent an alkyl group having 1 to 20 carbon atoms; $R^5$, $R^8$ and $R^9$ each independently represent a hydrogen atom or an alkyl group having 1 to 20 carbon atoms; $R^6$ and $R^{10}$ each independently represent an alkylene group having 1 to 20 carbon atoms; $R^{11}$ represents a hydrogen atom or an alkyl group having 1 to 20 carbon atoms; m and x each independently represent an integer of 1 to 3, and x m; p represents 1 or 2, y represents an integer of 1 to 3, and y<(p+1); z represents an integer of 1 or 2; each of $D^1$, $R^1$ to $R^{11}$, m, p, x, y and z, if present in a plural number, is respectively independent and may be the same as or different from each other; i represents an integer of 0 to 6, j represents an integer of 0 to 6, k represents an integer of 0 to 6, and (i+j+k) is an integer of 3 to 10; ((x×i)+(y×j)+(z×k)) is an integer of 5 to 30; and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

The modified conjugated diene-based polymer according to [10], wherein A in formula (I) is represented by any one of following general formulas (II) to (V):

wherein $B^1$ represents a single bond or a hydrocarbon group having 1 to 20 carbon atoms; a represents an integer of 1 to 10; and $B^1$, if present in a plural number, is respectively independent;

wherein $B^2$ represents a single bond or a hydrocarbon group having 1 to 20 carbon atoms; $B^3$ represents an alkyl group having 1 to 20 carbon atoms; a represents an integer of 1 to 10; and each of $B^2$ and $B^3$, if present in a plural number, is respectively independent;

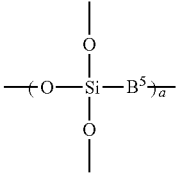

wherein $B^4$ represents a single bond or a hydrocarbon group having 1 to 20 carbon atoms; a represents an integer of 1 to 10; and $B^4$, if present in a plural number, is respectively independent; and

wherein $B^5$ represents a single bond or a hydrocarbon group having 1 to 20 carbon atoms; a represents an integer of 1 to 10; $B^5$, if present in a plural number, is respectively independent.

[12]

A method for producing the modified conjugated diene-based polymer according to any of [1] to [11], comprising steps of:

polymerizing at least a conjugated diene compound using an organomonolithium compound as a polymerization initiator to obtain a conjugated diene-based polymer; and reacting the conjugated diene-based polymer with a compound represented by the following general formula (VI):

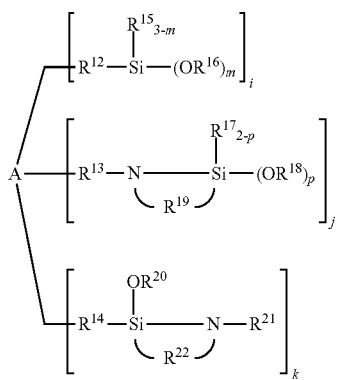

(VI)

wherein $R^{12}$ to $R^{14}$ each independently represent a single bond or an alkylene group having 1 to 20 carbon atoms; $R^{15}$ to $R^{18}$ and $R^{20}$ each independently represent an alkyl group having 1 to 20 carbon atoms; $R^{19}$ and $R^{22}$ each independently represent an alkylene group having 1 to 20 carbon atoms; $R^{21}$ represents an alkyl group or a trialkylsilyl group having 1 to 20 carbon atoms; m represents an integer of 1 to 3; p represents 1 or 2; each of $R^{12}$ to $R^{22}$, m and p, if present in a plural number, is respectively independent, and may be the same as or different from each other; i represents an integer of 0 to 6, j represents an integer of 0 to 6, k represents an integer of 0 to 6, and (i+j+k) is an integer of 3 to 10; and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

[13]

The method for producing the modified conjugated diene-based polymer according to [12], wherein A in formula (VI) is represented by any one of following general formulas (II) to (V):

(II)

wherein $B^1$ represents a single bond or a hydrocarbon group having 1 to 20 carbon atoms; a represents an integer of 1 to 10; and $B^1$, if present in a plural number, is respectively independent;

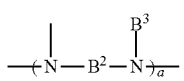

(III)

wherein $B^2$ represents a single bond or a hydrocarbon group having 1 to 20 carbon atoms; $B^3$ represents an alkyl group having 1 to 20 carbon atoms; a represents an integer of 1 to 10; and each of $B^2$ and $B^3$, if present in a plural number, is respectively independent;

(IV)

wherein $B^4$ represents a single bond or a hydrocarbon group having 1 to 20 carbon atoms; a represents an integer of 1 to 10; and $B^4$, if present in a plural number, is respectively independent; and

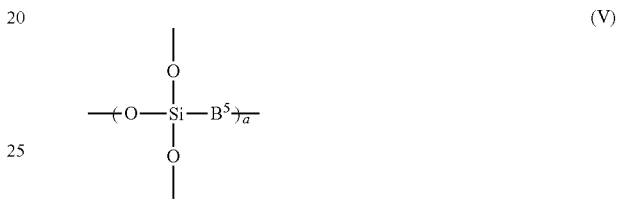

(V)

wherein $B^5$ represents a single bond or a hydrocarbon group having 1 to 20 carbon atoms; a represents an integer of 1 to 10; and $B^5$, if present in a plural number, is respectively independent.

[14]

The method for producing the modified conjugated diene-based polymer according to [13], wherein A in formula (VI) is represented by formula (II) or (III), wherein k represents 0 (zero).

[15]

The method for producing the modified conjugated diene-based polymer according to [13] or [14], wherein A in formula (VI) is represented by formula (II) or (III), wherein k represents 0 (zero), and a in formula (II) or (III) represents an integer of 2 to 10.

[16]

The method for producing the modified conjugated diene-based polymer according to any one of [12] to [15], wherein the organomonolithium compound is an alkyl lithium compound having a substituted amino group or dialkylamino lithium.

[17]

The method for producing the modified conjugated diene-based polymer according to any of [12] to [15], wherein the organomonolithium compound is an alkyl lithium compound.

[18]

A rubber composition, comprising:
a rubber component and
a filler in an amount of 5.0 parts by mass or more and 150 parts by mass based on 100 parts by mass of the rubber component, wherein the rubber component comprises the modified conjugated diene-based polymer according to any of [1] to [11] in an amount of 10% by mass or based on to a total amount of the rubber component.

[19]

A tire comprising the rubber composition according to [18].

Advantageous Effects of Invention

According to a modified conjugated diene-based polymer of the present invention, excellent workability obtained when used for obtaining a vulcanizate, excellent balance between a low hysteresis loss property and wet skit resistance and excellent abrasion resistance obtained when in the form of a vulcanizate, and practically sufficient fracture characteristics can be attained.

DESCRIPTION OF EMBODIMENTS

Now, an embodiment for practicing the present invention (hereinafter referred to as the "present embodiment") will be described in detail. The following embodiment is illustrative merely, and is not intended to limit the present invention to the following description. The present invention can be appropriately modified within the scope thereof.

[Modified Conjugated Diene-Based Polymer]

A modified conjugated diene-based polymer of the present embodiment has a weight-average molecular weight of $20 \times 10^4$ or more and $300 \times 10^4$ or less, comprises the modified conjugated diene-based polymer having a molecular weight of $200 \times 10^4$ or more and $500 \times 10^4$ or less in an amount of 0.25% by mass or more and 30% by mass or less with respect to the total amount (100% by mass) of the modified conjugated diene-based polymer, and has a shrinking factor (g') less than 0.64.

In general, there is a tendency that a branched polymer has a smaller molecule than a straight chain polymer having the same absolute molecular weight. The shrinking factor (g') of the present embodiment is an index of a ratio in a size occupied by a molecule to a straight chain polymer assumed to have the same absolute molecular weight. In other words, there is a tendency that as a branching degree of a polymer is larger, the shrinking factor (g') is smaller. In the present embodiment, an intrinsic viscosity is used as an index of a size of a molecule, and this term is used on the assumption that a straight chain polymer has an intrinsic viscosity complying with a relational formula, intrinsic viscosity $[\eta]=-3.883 \ M^{0.771}$. A shrinking factor (g') corresponding to each absolute molecular weight of a modified conjugated diene-based polymer is calculated, and an average of the shrinking factors (g') corresponding to the absolute molecular weights of $100 \times 10^4$ to $200 \times 10^4$ is defined as the shrinking factor (g') of the modified conjugated diene-based polymer. Herein, the "branch" is formed through a direct or indirect bond of one polymer to another polymer. Besides, the term "branching degree" refers to the number of polymers directly or indirectly bonding to one branch. For example, if five conjugated diene-based polymer chains described later are mutually bonded indirectly via a coupling residue described later, the branching degree is 5.

The shrinking factor (g') is less than 0.64, preferably 0.63 or less, more preferably 0.60 or less, further preferably 0.59 or less, and still further preferably 0.57 or less. Besides, the shrinking factor (g') is not especially limited in the lower limit and may be below a detection limit, and is preferably 0.30 or more, more preferably 0.33 or more, further preferably 0.35 or more, and still further preferably 0.45 or more. A modified conjugated diene-based polymer having a shrinking factor (g') falling in this range tends to be excellent in workability obtained when used for obtaining a vulcanizate.

Since the shrinking factor (g') tends to depend on the branching degree, the shrinking factor (g') can be controlled by using, for example, the branching degree as an index. Specifically, if a modified conjugated diene-based polymer has a branching degree of 6, the shrinking factor (g') thereof tends to be 0.59 or more and 0.63 or less, and if a modified conjugated diene-based polymer has a branching degree of 8, the shrinking factor (g') thereof tends to be 0.45 or more and 0.59 or less. The shrinking factor (g') is measured by a method described in examples below.

<Conjugated Diene-Based Polymer Chain>

A conjugated diene-based polymer chain of the present embodiment is a constituent unit of the modified conjugated diene-based polymer, and is a constituent unit derived from a conjugated diene-based polymer and generated, for example, through a reaction between the conjugated diene-based polymer and a coupling agent described later. The conjugated diene-based polymer chain of the present embodiment is preferably bonded to one coupling residue described later.

<Coupling Residue>

A coupling residue of the present embodiment is a constituent unit of the modified conjugated diene-based polymer bonded to the conjugated diene-based polymer chain, and is a constituent unit derived from a coupling agent and generated through a reaction between the conjugated diene-based polymer and the coupling agent described later.

The modified conjugated diene-based polymer of the present embodiment has branches, and the branching degree is preferably 5 or more. Besides, more preferably, the modified conjugated diene-based polymer has one or more of coupling residues and conjugated diene-based polymer chains bonded to the coupling residues, and the branches comprise a branch in which five or more of the conjugated diene-based polymer chains are bonded to one of the coupling residues. If the structure of the modified conjugated diene-based polymer is specified so that the branching degree can be 5 or more, and that the branches can comprise a branch in which five or more of the conjugated diene-based polymer chains are bonded to one coupling residue, the shrinking factor (g') can be more definitely set to be less than 0.64.

More preferably, the modified conjugated diene-based polymer of the present embodiment has branches, and the branching degree is 6 or more. Besides, further preferably, the modified conjugated diene-based polymer has one or more of coupling residues and conjugated diene-based polymer chains bonded to the coupling residues, and the branches comprise a branch in which six or more of the conjugated diene-based polymer chains are bonded to one of the coupling residues. If the structure of the modified conjugated diene-based polymer is specified so that the branching degree can be 6 or more, and that the branches can comprise a branch in which six or more of the conjugated diene-based polymer chains are bonded to one coupling residue, the shrinking factor (g') can be set to be 0.63 or less.

The modified conjugated diene-based polymer of the present embodiment has branches, and the branching degree is further preferably 7 or more, and the branching degree is further more preferably 8 or more. Besides, more preferably, the modified conjugated diene-based polymer has one or more of coupling residues and conjugated diene-based polymer chains bonded to the coupling residues, and the branches comprise a branch in which seven or more of the conjugated diene-based polymer chains are bonded to one of the coupling residues, and furthermore preferably, the branches comprise a branch in which eight or more of the conjugated diene-based polymer chains are bonded to one of the coupling residues. The number of conjugated diene-based polymer chains bonded to one coupling residue can be checked based on the value of the shrinking factor (g'), and if the structure of the modified conjugated diene-based polymer is specified so that the branching degree can be 8 or more, and that the branches can comprise a branch in which eight or more of the conjugated diene-based polymer chains are bonded to one coupling residue, the shrinking factor (g') can be set to be 0.59 or less.

Besides, the modified conjugated diene-based polymer of the present embodiment preferably has a nitrogen atom and a silicon atom. Thus, the workability obtained when used for obtaining a vulcanizate, and the balance between the low hysteresis loss property and the wet skid resistance and the abrasion resistance obtained when in the form of a vulcanizate tend to be more excellent as the effects of the present embodiment. Whether or not the modified conjugated diene-based polymer has a nitrogen atom can be checked depending on adsorption onto a specific column by a method described in the examples below. Besides, whether or not the modified conjugated diene-based polymer has a silicon atom can be checked through metal analysis by a method described in the examples below.

Furthermore, the modified conjugated diene-based polymer preferably has a silicon atom, and it is more preferable that at least one silicon atom of the modified conjugated diene-based polymer preferably constitutes an alkoxysilyl group or a silanol group having 1 to 20 carbon atoms. Thus, the effects of the present embodiment tend to be more conspicuous. Besides, from the viewpoint that hydrogen halide can be generated through a reaction with the air, the modified conjugated diene-based polymer preferably does not have halogen.

It is preferable that at least one end of the five or more conjugated diene-based polymer chains is bonded to a silicon atom of the coupling residue. Thus, the effects of the present embodiment tend to be more conspicuous. In this case, ends of a plurality of the conjugated diene-based polymer chains may be bonded to one silicon atom. Alternatively, an end of the conjugated diene-based polymer chain and an alkoxy group or a hydroxyl group having 1 to 20 carbon atoms may be bonded to one silicon atom, so that the one silicon atom can constitute an alkoxysilyl group or a silanol group having 1 to 20 carbon atoms. From the viewpoint that hydrogen halide can be generated through a reaction with the air, the coupling residue preferably does not have halogen.

In the present embodiment, when the modified conjugated diene-based polymer or a conjugated diene-based polymer described later is further hydrogenated in an inert solvent, all or some of double bonds can be converted into saturated hydrocarbon. In this case, heat resistance and weather resistance can be improved so as to prevent degradation of a product when processed at a high temperature, and the mobility as a rubber tends to be improved. As a result, further excellent performance can be exhibited in various uses including vehicle use. More specifically, a hydrogenation rate of an unsaturated double bond based on a conjugated diene compound can be arbitrarily selected in accordance with the purpose, and is not especially limited. When it is used in the form of a vulcanizate, a double bond of a conjugated diene portion preferably partially remains. From this viewpoint, a rate of hydrogenation of the conjugated diene portion in the conjugated diene-based polymer is preferably 3.0% or more and 70% or less, more preferably 5.0% or more and 65% or less, and further preferably 10% or more and 60% or less. In particular, if a vinyl group is selectively hydrogenated, the heat resistance and the mobility tend to be improved. The hydrogenation rate can be obtained using a nuclear magnetic resonance apparatus (NMR).

A modified conjugated diene-based copolymer of the present embodiment can be made into an oil-extended polymer additionally comprising an extender oil. No matter whether the modified conjugated diene-based copolymer of the present embodiment is non-oil-extended or oil-extended, a Mooney viscosity measured at 100° C. is preferably 20 or more and 100 or less, and more preferably 30 or more and 80 or less from the viewpoint of the workability obtained when used for obtaining a rubber vulcanizate and the abrasion resistance obtained when in the form of a vulcanizate. The Mooney viscosity is measured by a method described in the examples below.

A weight-average molecular weight of the modified conjugated diene-based polymer is $20 \times 10^4$ or more and $300 \times 10^4$ or less, preferably $50 \times 10^4$ or more, more preferably $64 \times 10^4$ or more, and further preferably $80 \times 10^4$ or more. The weight-average molecular weight is preferably $250 \times 10^4$ or less, preferably $180 \times 10^4$ or less, and more preferably $150 \times 10^4$ or less. If the weight-average molecular weight is $20 \times 10^4$ or more, the balance between the low hysteresis loss property and the wet skid resistance and the abrasion resistance obtained when in the form of a vulcanizate are excellent as the effects of the present embodiment. Besides, if the weight-average molecular weight is $300 \times 10^4$ or less, the workability and dispersibility of a filler obtained when used for obtaining a vulcanizate can be excellent, and practically sufficient fracture characteristics can be attained. The weight-average molecular weights of the modified conjugated diene-based polymer and the conjugated diene-based polymer described later are measured by a method described in the examples below.

The modified conjugated diene-based polymer comprises the modified conjugated diene-based polymer having a molecular weight of $200 \times 10^4$ or more and $500 \times 10^4$ or less (hereinafter sometimes referred to as the "specific high molecular weight component") in an amount of 0.25% by mass or more and 30% by mass or less with respect to the total amount (100% by mass) of the modified conjugated diene-based polymer. Thus, the balance between the low hysteresis loss property and the wet skid resistance and the abrasion resistance obtained when in the form of a vulcanizate are excellent as the effects of the present embodiment. The modified conjugated diene-based polymer comprises the specific high molecular weight component in an amount of preferably 1.0% by mass or more, more preferably 1.4% by mass or more, further preferably 1.75% by mass or more, still further preferably 2.0% by mass or more, still further preferably 2.15% by mass or more, and extremely preferably 2.5% by mass or more. Besides, the modified conjugated diene-based polymer comprises the specific high molecular weight component in an amount of preferably 28% by mass or less, more preferably 25% by mass or less, further preferably 20% by mass or less, and 18% by mass or less. Herein, the term "molecular weight" refers to a molecular weight in terms of standard polystyrene obtained by GPC (gel permeation chromatography). In order to obtain a modified conjugated diene-based polymer comprising the specific high molecular weight component in a content falling in the above-described range, it is preferable to control reaction conditions in a polymerization step and a reaction step described later. For example, in the polymerization step, the use amount of an organomonolithium compound described later as a polymerization initiator may be controlled, and the control may be performed as follows.

In the polymerization step described later, no matter which of continuous polymerization or batch polymerization is employed, a method using a residence time distribution may be employed, namely, a time distribution of a growth reaction may be expanded. Examples of a specific method for the continuous polymerization include: a method in which preferably a tank reactor equipped with a stirrer is used as a back-mix reactor of a type performing vigorous mixing with a stirrer, and more preferably a part of a tubular reactor used as a complete mixing reactor is recirculated in the continuous polymerization, a method in which a feeding portion of a polymerization initiator is provided not only in or in the vicinity of a monomer inlet but also in the middle of a polymerization reactor, and a method in which a tank reactor and a tubular reactor are combined. In these methods, with a residence time distribution expanded, a polymer component having a long residence time is obtained as the high molecular weight component. Besides, a specific example of the batch polymerization includes a method in which a polymerization initiator is preferably fed continuously or intermittently from the start to the middle of the polymerization, or at the start of the polymerization and/or in the middle of the polymerization. In this method, it is regarded that a polymer having been polymerized from the polymerization start when the polymerization initiator is initially fed is obtained as the high molecular weight component and has a different molecular weight from a polymer started to be polymerized later. More specifically, there is a tendency that a polymer having an expanded molecular weight distribution can be obtained by feeding, to a monomer, a polymerization initiator in an amount corresponding to a target molecular weight continuously, for example, between a conversion ratio of 0% and 95%. When the above-described method is employed, there is a tendency that the activity ratio of a living end of the conjugated diene-based polymer before the reaction step becomes higher, and there also is a tendency that a modified conjugated diene-based polymer having a high coupling ratio attained after coupling, namely, a high modification percentage, can be obtained. Among these methods, the method in which a tank reactor equipped with a stirrer is used as a back-mix reactor of a type performing vigorous mixing with a stirrer is further preferably employed. Besides, a temperature change after the polymerization step until the addition of a coupling agent is preferably 10° C. or less, and more preferably 5° C. or less.

In addition to the control of the reaction conditions in the polymerization step, as control of the reaction conditions in a modification step, for example, the reaction is preferably performed with a reaction time set to preferably 10 seconds or more, and more preferably 30 seconds or more. Besides, a time from the end of the polymerization step to the start of the reaction step is preferably shorter, and more preferably 5 minutes or less. Thus, there is a tendency that a high coupling ratio and a high modification percentage can be easily obtained and the high molecular weight component can be easily obtained. Furthermore, as the number of functional groups in the coupling agent is larger, the branching degree of the resultant modified conjugated diene polymer is more easily shifted from a desired value if the addition amount of the coupling agent cannot be controlled in a desired range in the reaction step. Accordingly, in order to generate the high molecular weight component in a desired amount, it is preferable to properly control the addition amount of the coupling agent. In order to properly control the addition amount of the coupling agent, for example, a method in which the coupling agent is diluted before the addition is preferably employed. A dilute concentration here is preferably 0.1 mmol/L to 1.1 mol/L, and more preferably 1 mmol/L to 0.75 mol/L. If the shift in the addition amount is the same, a shift between the mole number of the conjugated diene-based polymer and the mole number of the coupling agent tends to be smaller when it is diluted. Besides, a water content of a solvent used for the dilution is preferably 100 mass ppm or less, more preferably 50 mass ppm or less, further preferably 30 mass ppm or less, and further more preferably 10 mass ppm or less. If the water content of the solvent used for the dilution is 100 mass ppm or less, the coupling agent and water are reacted to reduce the number of the functional groups in the coupling agent, and therefore, the shift between the mole number of the conjugated diene-based polymer and the mole number of the coupling agent can be suppressed, and hence the high molecular weight component tends to be easily obtained.

In the modified conjugated diene-based polymer, a molecular weight distribution (Mw/Mn) corresponding to a ratio of a weight-average molecular weight (Mw) to a number-average molecular weight (Mn) is preferably 1.6 or more and 3.0 or less. A modified conjugated diene-based polymer having a molecular weight distribution falling in this range tends to be more excellent in the workability obtained when used for obtaining a vulcanizate and more excellent in the abrasion resistance obtained when in the form of a vulcanizate.

The number-average molecular weights, the weight-average molecular weights, the molecular weight distributions and the contents of the specific high molecular weight component of the modified conjugated diene-based polymer and the conjugated diene-based polymer described later are measured by methods described in the examples below.

The modified conjugated diene-based polymer of the present embodiment is preferably represented by the following general formula (I):

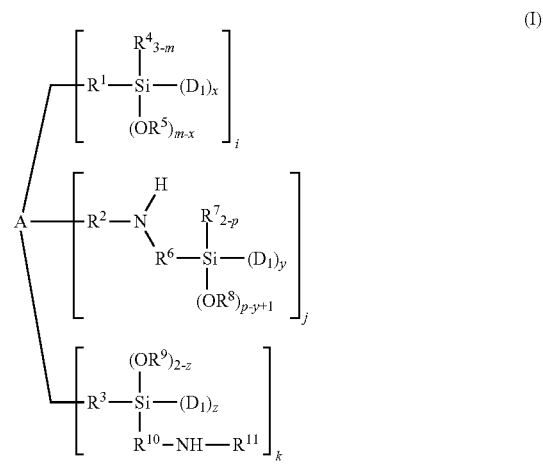

In formula (I), $D^1$ represents a diene-based polymer chain, and a weight-average molecular weight of the diene-based polymer chain is preferably $10 \times 10^4$ to $100 \times 10^4$. $R^1$ to $R^3$ each independently represent a single bond or an alkylene group having 1 to 20 carbon atoms, $R^4$ and $R^7$ each independently represent an alkyl group having 1 to 20 carbon atoms, $R^5$, $R^8$ and $R^9$ each independently represent a hydrogen atom or an alkyl group having 1 to 20 carbon atoms, $R^6$ and $R^{10}$ each independently represent an alkylene group having 1 to 20 carbon atoms, and $R^{11}$ represents a hydrogen atom or an alkyl group having 1 to 20 carbon atoms.

Besides, m and x each represent an integer of 1 to 3, x≤m, p represents 1 or 2, y represents an integer of 1 to 3, y≤(p+1), and z represents an integer of 1 or 2. Each of $D^1$, $R^1$ to $R^{11}$, m, p, x, y and z, if present in a plural number, is respectively independent and may be the same as or different from each other. Furthermore, i represents an integer of 0 to 6, j represents an integer of 0 to 6, k represents an integer of 0 to 6, (i+j+k) is an integer of 3 to 10, and ((x×i)+(y×j)+(z×k)) is an integer of 5 to 30. Besides, A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen. Examples of a hydrocarbon group represented by A includes saturated, unsaturated, aliphatic and aromatic hydrocarbon groups. The active group not having active hydrogen is an organic group inactivating an active end of the conjugated diene-based polymer. An example of such an organic group includes an organic group not having a functional group having active hydrogen such as a hydroxyl group (—OH), a secondary amino group (>NH), a primary amino group (—NH$_2$) or a sulfhydryl group (—SH). The modified conjugated diene-based polymer represented by formula (I) tends to be more excellent in the workability obtained when used for obtaining a vulcanizate, and more excellent in the balance between the low hysteresis loss property and the wet skid resistance and the abrasion resistance obtained when in the form of a vulcanizate as the effects of the present embodiment.

In the modified conjugated diene-based polymer of the present embodiment, A in formula (I) is preferably represented by any one of the following general formulas (II) to (V):

(II)

In formula (II), $B^1$ represents a single bond or a hydrocarbon group having 1 to 20 carbon atoms, and a represents an integer of 1 to 10. $B^1$, if present in a plural number, is respectively independent.

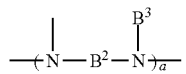
(III)

In formula (III), $B^2$ represents a single bond or a hydrocarbon group having 1 to 20 carbon atoms, $B^3$ represents an alkyl group having 1 to 20 carbon atoms, and a represents an integer of 1 to 10. Each of $B^2$ and $B^3$, if present in a plural number, is respectively independent.

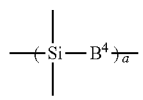
(IV)

In formula (IV), $B^4$ represents a single bond or a hydrocarbon group having 1 to 20 carbon atoms, and a represents an integer of 1 to 10. $B^4$, if present in a plural number, is respectively independent.

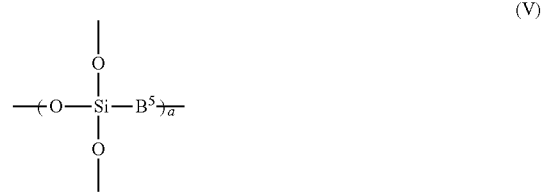
(V)

In formula (V), $B^5$ represents a single bond or a hydrocarbon group having 1 to 20 carbon atoms, and a represents an integer of 1 to 10. $B^5$, if present in a plural number, is respectively independent. If A is represented by any one of formulas (II) to (V), the workability obtained when used for obtaining a vulcanizate tends to be more excellent, and the balance between the low hysteresis loss property and the wet skid resistance and the abrasion resistance obtained when in the form of a vulcanizate tend to be more excellent as the effects of the present embodiment. Besides, such a polymer tends to be practically more easily available.

[Method for Producing Modified Conjugated Diene-Based Polymer]

A method for producing the modified conjugated diene-based polymer of the present embodiment includes a polymerization step of polymerizing at least a conjugated diene compound using an organomonolithium compound as a polymerization initiator to obtain a conjugated diene-based polymer, and a reaction step of reacting the conjugated diene-based polymer with a penta- or higher-functional reactive compound (hereinafter sometimes referred to as the "coupling agent") reactive to an active end of the conjugated diene-based polymer of the present embodiment. As the coupling agent, a penta- or higher-functional reactive compound having a nitrogen atom and a silicon atom is preferably reacted. The production method preferably comprises a reaction step of reacting a compound represented by the following general formula (VI):

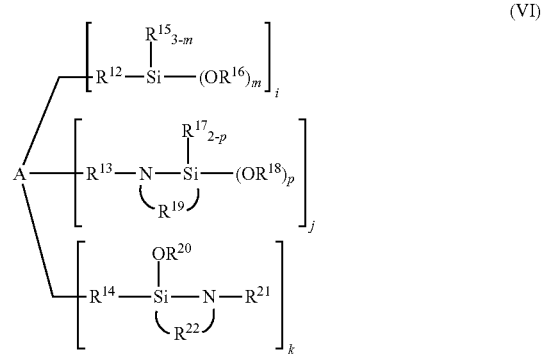
(VI)

In formula (VI), $R^{12}$ to $R^{14}$ each independently represent a single bond or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, and $R^{21}$ represents an alkyl group or a trialkylsilyl group having 1 to 20 carbon atoms. Besides, m represents an integer of 1 to 3, and p represents 1 or 2. Each of $R^{12}$ to $R^{22}$, m and p, if present in a plural number, is respectively independent, and may be the same as or different from each other. Furthermore, i represents an integer of 0 to 6, j represents an integer of 0 to 6, k represents an integer of 0 to 6, and (i+j+k) is an integer of 3 to 10. Besides, A represents hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen. Examples of a hydrocarbon group represented by A includes saturated, unsaturated, aliphatic and aromatic hydrocarbon groups. The organic group not having active hydrogen is an organic group inactivating an active end of the conjugated diene-based polymer. An example of such an organic group includes an organic group not having a functional group having active hydrogen such as a hydroxyl group (—OH), a secondary amino group (>NH), a primary amino group (—$NH_2$) or a sulfhydryl group (—SH).

[Polymerization Step]

In the polymerization step of the present embodiment, using an organomonolithium compound as a polymerization initiator, at least a conjugated diene compound is polymerized to obtain a conjugated diene-based polymer. The polymerization step is preferably performed by polymerization through a growth reaction by living anionic polymerization, and thus, a conjugated diene-based polymer having an active end can be obtained, and there is a tendency that a modified diene-based polymer having a high modification percentage can be obtained.

<Conjugated Diene-Based Polymer>

The conjugated diene-based polymer of the present embodiment is obtained by polymerizing at least a conjugated diene compound, and is obtained, if necessary, by copolymerizing both a conjugated diene compound and a vinyl-substituted aromatic compound. The conjugated diene compound of the present embodiment is not especially limited as long as it is a polymerizable monomer, and is preferably a conjugated diene compound comprising 4 to 12 carbon atoms per molecule, and more preferably a conjugated diene compound comprising 4 to 8 carbon atoms. Examples of such a conjugated diene compound include, but are not limited to, 1,3-butadiene, isoprene, 2,3-dimethyl-1,3-butadiene, 1,3-pentadiene, 3-methyl-1,3-pentadiene, 1,3-hexadiene and 1,3-heptadiene. Among these, 1,3-butadiene and isoprene are preferred from the viewpoint of industrial availability. One of these compounds may be singly used, or two or more of these may be used together.

The vinyl-substituted aromatic compound is not especially limited as long as it is a monomer copolymerizable with the conjugated diene compound, and is preferably a monovinyl aromatic compound. Examples of the monovinyl aromatic compound include, but are not limited to, styrene, p-methylstyrene, α-methylstyrene, vinyl ethyl benzene, vinyl xylene, vinyl naphthalene and diphenyl ethylene. Among these, styrene is preferred from the viewpoint of industrial availability. One of these compounds may be singly used, or two or more of these may be used together.

If the conjugated diene compound and/or the vinyl-substituted aromatic compound comprises any of allenes, acetylenes and the like as an impurity, it is apprehended that the reaction in the reaction step described later may be impaired. Therefore, the sum of content concentrations (masses) of these impurities is preferably 200 ppm or less, more preferably 100 ppm or less, and further preferably 50 ppm or less. Examples of the allenes include propadiene and 1,2-butadiene. Examples of the acetylenes include ethyl acetylene and vinyl acetylene.

The conjugated diene-based polymer may be a random copolymer or a block copolymer. In order to form the conjugated diene-based polymer as a rubber-like polymer, the conjugated diene compound is used in an amount of preferably 40% by mass or more and more preferably 55% by mass or more based on the amount of all monomers used in the conjugated diene-based polymer.

Examples of the random copolymer include, but are not limited to, a random copolymer comprising two or more conjugated diene compounds such as a butadiene-isoprene random copolymer, and a random copolymer comprising conjugated diene and the vinyl-substituted aromatic compound such as a butadiene-styrene random copolymer, an isoprene-styrene random copolymer or a butadiene-isoprene-styrene random copolymer. A composition distribution of each monomer comprised in a copolymer chain is not especially limited, and examples include a completely random copolymer whose composition is almost statistically random, and a tapered (gradient) random copolymer whose composition is distributed in a tapered manner. A bonding mode of the conjugated diene, namely, the composition of a 1,4-bond, a 1,2-bond or the like may be homogeneous or distributed.

Examples of the block copolymer include, but are not limited to, a di-block copolymer consisting of two blocks, a tri-block copolymer consisting of three blocks, and a tetra-block copolymer consisting of four blocks. A polymer constituting every block may be a polymer comprising one monomer or a copolymer comprising two or more monomers. Assuming that a polymer block comprising 1,3-butadiene is expressed as "B", a copolymer of 1,3-butadiene and isoprene is expressed as "B/I", a copolymer of 1,3-butadiene and styrene is expressed as "B/S" and a polymer block comprising styrene is expressed as "S", the block copolymer is expressed as a B-B/I di-block copolymer, a B-B/S di-block copolymer, a S-B di-block copolymer, a B-B/S-S tri-block copolymer, a S-B-S tri-block copolymer, a S-B-S-B tetra-block copolymer or the like.

In the above-described formula, there is no need to always clearly define a boundary between blocks. Besides, if one polymer block is a copolymer comprising two monomers A and B, the monomers A and B may be distributed homogeneously or in a tapered manner in the block.

<Polymerization Initiator>

As the polymerization initiator of the present embodiment, at least an organomonolithium compound is used. Examples of the organomonolithium compound include, but are not limited to, a low molecular weight compound and an organomonolithium compound of a solubilized oligomer. Another example of the organomonolithium compound includes a compound having, as a bonding mode between an organic group and lithium therein, a carbon-lithium bond, a nitrogen-lithium bond or a tin-lithium bond.

The use amount of the organomonolithium compound as a polymerization initiator is preferably determined on the basis of the molecular weight of the target conjugated diene-based polymer or modified conjugated diene-based polymer. There is a tendency that a ratio of the use amount of a monomer such as the conjugated diene compound to the use amount of the polymerization initiator relates to the degree of polymerization, namely, the number-average molecular weight and/or the weight-average molecular weight. Accordingly, in order to increase the molecular weight, adjustment may be made to reduce the amount of the polymerization initiator, and in order to reduce the molecular weight, the adjustment may be made to increase the amount of the polymerization initiator.

The organomonolithium compound is preferably an alkyl lithium compound having a substituted amino group or dialkylamino lithium from the viewpoint that it is used in one method for introducing a nitrogen atom into the conjugated diene-based polymer. In this case, a conjugated diene-based polymer having a nitrogen atom comprising an amino group at a polymerization starting end is obtained.

The substituted amino group refers to an amino group having no active hydrogen or having a structure in which active hydrogen is protected. Examples of an alkyl lithium compound comprising an amino group having no active hydrogen include, but are not limited to, 3-dimethylaminopropyl lithium, 3-diethylaminopropyl lithium, 4-(methyl-propylamino)butyl lithium and 4-hexamethyleneiminobutyl lithium. Examples of an alkyl lithium compound comprising an amino group having a structure in which active hydrogen is protected include, but are not limited to, 3-bistrimethylsilylaminopropyl lithium and 4-trimethylsilylmethylaminobutyl lithium.

Examples of the dialkylamino lithium include, but are not limited to, lithium dimethylamide, lithium diethylamide, lithium dipropylamide, lithium dibutylamide, lithium di-n-hexylamide, lithium diheptylamide, lithium diisopropylamide, lithium dioctylamide, lithium-di-2-ethylhexylamide, lithium didecylamide, lithium ethylpropylamide, lithium ethylbutylamide, lithium ethylbenzylamide, lithium methylphenetylamide, lithium hexamethyleneimide, lithium pyrrolidide, lithium piperidide, lithium heptamethyleneimide, lithium morpholide, 1-lithioazacyclooctane, 6-lithio-1,3,3-trimethyl-6-azabicyclo[3.2.1] octane and 1-lithio-1,2,3,6-tetrahydropyridine.

Such an organomonolithium compound having a substituted amino group can be reacted with a small amount of a polymerizable monomer, such as 1,3-butadiene, isoprene or styrene, to be used as an organomonolithium compound of a soluble oligomer.

The organomonolithium compound is preferably an alkyl lithium compound from the viewpoint of industrial availability and controllability of the polymerization reaction. In this case, a conjugated diene-based polymer having an alkyl group at a polymerization starting end can be obtained. Examples of the alkyl lithium compound include, but are not limited to, n-butyllithium, sec-butyllithium, tert-butyllithium, n-hexyllithium, benzyllithium, phenyllithium and stilbene lithium. From the viewpoint of the industrial availability and the controllability of the polymerization reaction, the alkyl lithium compound is preferably n-butyllithium or sec-butyllithium.

One of these organomonolithium compounds may be singly used, or two or more of these may be used together. Alternatively, another organic metal compound may be used together. Examples of the organic metal compound include alkaline earth metal compounds, other alkaline metal compounds and other organic metal compounds. Examples of the alkaline earth metal compounds include, but are not limited to, organic magnesium compounds, organic calcium compounds and organic strontium compounds. In addition, the examples include alkoxide, sulfonate, carbonate and amide compounds of the alkaline earth metals. Examples of the organic magnesium compounds include dibutyl magnesium and ethyl butyl magnesium. Examples of the other organic metal compounds include organic aluminum compounds.

Examples of the polymerization reaction type employed in the polymerization step include, but are not limited to, batch and continuous polymerization reaction types. In the continuous type, one reactor or two or more connected reactors can be used. As a reactor for the continuous type, for example, a tank or tubular reactor equipped with a stirrer is used. It is preferable, in the continuous type, that a monomer, an inert solvent and a polymerization initiator are continuously fed to the reactor, a polymer solution comprising a polymer is obtained in the reactor, and the polymer solution is continuously discharged. As a reactor for the batch type, for example, a tank reactor equipped with a stirrer is used. It is preferable, in the batch type, that a monomer, an inert solvent and a polymerization initiator are fed, the monomer is continuously or intermittently additionally fed if necessary during the polymerization, a polymer solution comprising a polymer is obtained in the reactor, and the polymer solution is discharged after completing the polymerization. In the present embodiment, in order to obtain a conjugated diene-based polymer having an active end at a high ratio, the continuous type in which a polymer can be continuously discharged to be supplied to a next reaction in a short period of time is preferably employed.

In the polymerization step, the polymerization is performed preferably in an inert solvent. Examples of the solvent include hydrocarbon-based solvents such as saturated hydrocarbon and aromatic hydrocarbon. Specific examples of the hydrocarbon-based solvent include, but are not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon comprising a mixture of any of these. Impurities of allenes and acetylenes are preferably treated with an organic metal compound before the solvent is supplied to the polymerization reaction because thus, a conjugated diene-based polymer having an active end in a high concentration tends to be obtained, and a modified conjugated diene-based polymer having a high modification percentage tends to be obtained.

In the polymerization step, a polar compound may be added. Thus, there is a tendency that an aromatic vinyl compound can be randomly copolymerized with the conjugated diene compound, and can be used also as a vinyl agent for controlling a microstructure of a conjugated diene portion. Besides, there is a tendency that it is advantageous for acceleration of the polymerization reaction and the like.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene and 2,2-bis(2-oxolanyl) propane; tertiary amine compounds such as tetramethylethylenediamine, dipiperidinoethane, trimethylamine, triethylamine, pyridine and quinuclidine; alkaline metal alkoxide compounds such as potassium-tert-amylate, potassium-tert-butylate, sodium-tert-butylate and sodium amylate; and phosphine compounds such as triphenylphosphine. One of these polar compounds may be singly used, or two or more of these may be used together.

The use amount of the polar compound is not especially limited but can be selected in accordance with the purpose or the like, and is preferably 0.01 mol or more and 100 mol or less per mol of the polymerization initiator. Such a polar compound (a vinyl agent) can be used, as a microstructure modifier for a conjugated diene portion of the polymer, in an appropriate amount in accordance with a desired amount of bound vinyl. There is a tendency that many polar compounds simultaneously have an effective randomizing effect in copolymerization of a conjugated diene compound and an aromatic vinyl compound, and can be used as a modifier for the distribution of the aromatic vinyl compound and the amount of a styrene block. As a method for randomizing the conjugated diene compound and the aromatic vinyl compound, for example, a method as described in Japanese Patent Laid-Open No. 59-140211 in which a copolymerization reaction is started with the whole amount of styrene and a part of 1,3-butadiene with the rest of 1,3-butadiene intermittently added during the copolymerization reaction may be employed.

In the polymerization step, a polymerization temperature is preferably a temperature at which the living anionic polymerization proceeds, and from the viewpoint of productivity, is more preferably 0° C. or more and further preferably 120° C. or less. If the polymerization temperature falls in this range, there is a tendency that a reaction amount of the coupling agent reacted to the active end can be sufficiently attained after completing the polymerization. The polymerization temperature is still further preferably 50° C. or more and 100° C. or less.

The conjugated diene-based polymer obtained by the polymerization step before the reaction step has a Mooney viscosity, measured at 110° C., of preferably 10 or more and 90 or less, more preferably 15 or more and 85 or less, and further preferably 20 or more and 60 or less. If the Mooney viscosity falls in this range, the modified conjugated diene-based polymer of the present embodiment tends to be excellent in the workability and the abrasion resistance.

The amount of bound conjugated diene in the conjugated diene-based polymer or the modified conjugated diene-based polymer of the present embodiment is not especially limited, and is preferably 40% by mass or more and 100% by mass or less, and more preferably 55% by mass or more and 80% by mass or less. Besides, the amount of bound aromatic vinyl in the conjugated diene-based polymer or the modified conjugated diene-based polymer of the present embodiment is not especially limited, and is preferably 0% by mass or more and 60% by mass or less, and more preferably 20% by mass or more and 45% by mass or less. If the amount of bound conjugated diene and the amount of bound aromatic vinyl respectively fall in the above-described ranges, the balance between the low hysteresis loss property and the wet skid resistance and the abrasion resistance obtained when in the form of a vulcanizate, and the fracture characteristics tend to be more excellent. Here, the amount of bound aromatic vinyl can be measured using ultraviolet absorption of a phenyl group, and based on this, the amount of bound conjugated diene can be also obtained. Specifically, these amounts are measured in accordance with a method described in the examples below.

In the conjugated diene-based polymer or the modified conjugated diene-based polymer of the present embodiment, the amount of bound vinyl in a conjugated diene bond unit is not especially limited, and is preferably 10% by mole or more and 75% by mole or less, and more preferably 20% by mole or more and 65% by mole or less. If the amount of bound vinyl falls in the above-described range, the balance between the low hysteresis loss property and the wet skid resistance and the abrasion resistance obtained when in the form of a vulcanizate and the fracture strength tend to be more excellent. Here, if the modified diene-based polymer is a copolymer of butadiene and styrene, the amount of bound vinyl (the amount of a 1,2-bond) in a butadiene bond unit can be obtained by Hampton method (R. R. Hampton, Analytical Chemistry, 21, 923 (1949)). Specifically, it is measured by a method described in the examples below.

As for the microstructure of the modified conjugated diene-based polymer, if the amounts of the aforementioned bonds in the modified conjugated diene-based polymer fall respectively in the above-described ranges and the glass transition temperature of the modified conjugated diene-based polymer is −45° C. or more and −15° C. or less, there is a tendency that a vulcanizate more excellent in the balance between the low hysteresis loss property and the wet skid resistance can be obtained. The glass transition temperature is defined as a peak top (an inflection point) of a DSC differential curve obtained by recording a DSC curve during temperature increase in a prescribed range in accordance with ISO 22768:2006. Specifically, it is measured in accordance with a method described in the examples below.

If the modified conjugated diene-based polymer of the present embodiment is a conjugated diene-aromatic vinyl copolymer, it preferably comprises a few or no blocks in which 30 or more aromatic vinyl units are chained. More specifically, if the copolymer is a butadiene-styrene copolymer, in employing a known method in which the copolymer is decomposed by Kolthoff method (a method described by I. M. Kolthoff, et al., J. Polym. Sci. 1, 429 (1946)) to analyze the amount of polystyrene insoluble in methanol, blocks in each of which 30 or more aromatic vinyl units are chained are preferably 5.0% by mass or less, and more preferably 3.0% by mass or less based on the total amount of the copolymer.

If the conjugated diene-based polymer of the present embodiment is a conjugated diene-aromatic vinyl copolymer, a large proportion of an aromatic vinyl unit is preferably present singly. Specifically, if the copolymer is a butadiene-styrene copolymer, when the copolymer is decomposed by employing a method through ozonolysis known as a method of Tanaka et al., (Polymer, 22, 1721 (1981)) to analyze a styrene chain distribution by GPC, it is preferable that the amount of isolated styrene to the whole amount of bound styrene is 40% by mass or more, and that the amount of a chain styrene structure consisting of 8 or more chained styrene is 5.0% by mass or less. In this case, a resultant vulcanized rubber attains excellent performance of particularly low hysteresis loss.

[Reaction Step]

In the reaction step of the present embodiment, the penta- or higher-functional reactive compound (hereinafter sometimes referred to as the "coupling agent") is reacted with the active end of the conjugated diene-based polymer of the present embodiment, and thus, the modified conjugated diene-based polymer of the present embodiment in which a coupling residue and a conjugated diene-based polymer having 5 or more molecules are bonded can be obtained. It is preferable to react a penta- or higher-functional reactive compound having a nitrogen atom and a silicon atom.

<Coupling Agent>

The coupling agent used in the reaction step of the present embodiment may be any agent as long as it is a penta- or higher-functional reactive compound, and is preferably a penta- or higher-functional reactive compound having a nitrogen atom and a silicon atom, and preferably having at least three silicon-containing functional groups. The coupling agent is preferably a compound in which at least one silicon atom constitutes an alkoxysilyl group or a silanol group having 1 to 20 carbon atoms, and is more preferably a compound represented by formula (VI) described above as the coupling agent.

The alkoxysilyl group of the coupling agent tends to react with, for example, the active end of the conjugated diene-based polymer to dissociate alkoxy lithium, and to form a bond between an end of the conjugated diene-based polymer chain and silicon of the coupling residue. A value obtained by subtracting the number of SiOR groups reduced through the reaction from the total number of SiOR groups comprised in one molecule of the coupling agent corresponds to the number of alkoxysilyl groups comprised in the coupling residue. Besides, an aza-sila cycle group comprised in the coupling agent forms a bond of a >N—Li bond and a bond between the end of the conjugated diene-based polymer and silicon of the coupling residue. It is noted that the >N—Li bond tends to be easily changed to >NH and LiOH with water or the like used in finishing. Besides, in the coupling agent, an unreacted and remained alkoxysilyl group tends to be easily changed to silanol (a Si—OH group) with water or the like used in the finishing.

In the reaction step, if the active end of 3 mol of the conjugated diene-based polymer is reacted with 1 mol of trialkoxysilane group having three alkoxy group per silicon atom, there is a tendency that 1 mol of the alkoxy group remains unreacted although the reaction with the conjugated diene-based polymer occurs up to 2 mol. This can be confirmed because 1 mol of the conjugated diene-based polymer remains without reacting as an unreacted polymer. Incidentally, if a large amount of alkoxy group is reacted, a condensation reaction occurs during the finishing and storage, and hence, there is a tendency that the viscosity of the polymer can be inhibited from largely changing. In particular, the condensation reaction tends to be inhibited if the modified conjugated diene-based polymer comprises 3 or more reaction products of the reaction of 2 mol of the conjugated diene copolymer with 1 mol of a trialkoxysilane group, namely, the branching degree is 6 or more, and the modified conjugated diene-based copolymer comprises no other reactable alkoxy group.

Examples of the coupling agent include, but are not limited to, tris(3-trimethoxysilylpropyl)amine, tris(3-tirethoxysilylpropyl) amine, tris(3-tripropoxysilylpropyl) amine, bis(3-trimethoxysilylpropyl)-[3-(2,2-dimethoxy-1-aza-2-silacyclopentane)propyl]amine, tetrakis(3-trimethoxysilylpropyl)-1,3-propanediamine, tris(3-trimethoxysilylpropyl)-[3-(1-methoxy-2-trimethylsilyl-1-sila-2-azacyclopentane)propyl]-1,3-propanediamine, tris(3-trimethoxysilylpropyl)-[3-(1-methoxy-2-methyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, tetrakis(3-trimethoxysilylpropyl)-1,6-hexamethylenediamine, pentakis(3-trimethoxysilylpropyl)-diethylenetriamine, tris(3-trimethoxysilylpropyl)-methyl-1,3-propanediamine, tetrakis[3-(2,2-dimethoxy-1-aza-2-silacyclopentane)propyl]silane, bis(3-trimethoxysilylpropyl)-bis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl] silane, 3-tris[2-(2,2-dimethoxy-1-aza-2-silacyclopentane)ethoxy]silyl-1-trimethoxysilylpropane, 1-[3-(1-methoxy-2-trimethylsilyl-1-sila-2-azacyclopentane)propyl]-3,4,5-tris (3-trimethoxysilylpropyl)-cyclohexane, 1-[3-(2,2-dimethoxy-1-aza-2-silacyclopentane)propyl]-3,4,5-tris(3-trimethoxysilylpropyl)cyclohexane, 3,4,5-tris(3-trimethoxysilylpropyl)cyclohexyl-[3-(2,2-dimethoxy-1-aza-2-silacyclopentane)propyl]ether, (3-trimethoxysilylpropyl)phosphate, bis(3-trimethoxysilylpropyl)-[3-(2,2-dimethoxy-1-aza-2-silacyclopentane)propyl]phosphate, bis[3-(2,2-dimethoxy-1-aza-2-cyclopentane)propyl]-(3-trimethoxysilylpropyl)phosphate and tris[3-(2,2-dimethoxy-1-aza-2-silacyclopentane) propyl]phosphate.

A reaction temperature employed in the reaction step is preferably a temperature equivalent to the polymerization temperature of the conjugated diene-based polymer, more preferably 0° C. or more and 120° C. or less, and further preferably 50° C. or more and 100° C. or less. Besides, a temperature change after the polymerization step until the addition of the coupling agent is preferably 10° C. or less, and more preferably 5° C. or less.

A reaction time employed in the reaction step is preferably 10 seconds or more, and more preferably 30 seconds or more. A time from the end of the polymerization step to the start of the reaction step is preferably shorter, and more preferably 5 minutes or less. Thus, there is a tendency that a high coupling ratio and a high modification percentage can be obtained.

Mixing performed in the reaction step may be either mechanical stirring or stirring with a static mixer or the like. If the polymerization step is performed in the continuous type, the reaction step is preferably performed also in the continuous type. As a reactor used in the reaction step, for example, a tank or tubular reactor equipped with a stirrer is used. The coupling agent may be diluted with an inert solvent and continuously supplied to the reactor. If the polymerization step is performed in the batch type, the reaction step may be performed by a method in which the polymerization reactor is charged with the coupling agent, or a method in which the polymer is transferred to another reactor for performing the reaction step.

In formula (VI), A is preferably represented by any one of the following general formulas (II) to (V):

(II)

In formula (II), $B^1$ represents a single bond or a hydrocarbon group having 1 to 20 carbon atoms, and a represents an integer of 1 to 10. $B^1$, if present in a plural number, is respectively independent.

(III)

In formula (III), $B^2$ represents a single bond or a hydrocarbon group having 1 to 20 carbon atoms, $B^3$ represents an alkyl group having 1 to 20 carbon atoms, and a represents an integer of 1 to 10. Each of $B^2$ and $B^3$, if present in a plural number, is respectively independent.

(IV)

In formula (IV), $B^4$ represents a single bond or a hydrocarbon group having 1 to 20 carbon atoms, and a represents an integer of 1 to 10. $B^4$, if present in a plural number, is respectively independent.

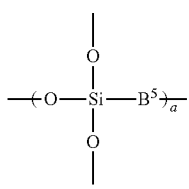

(V)

In formula (V), $B^5$ represents a single bond or a hydrocarbon group having 1 to 20 carbon atoms, and a represents an integer of 1 to 10. $B^5$, if present in a plural number, is respectively independent. If A is represented by any one of formulas (II) to (V), there is a tendency that a modified conjugated diene-based polymer of the present embodiment having more excellent performances can be obtained.

Examples of the coupling agent to be used when A in formula (VI) is represented by formula (II) include, but are not limited to, tris(3-trimethoxysilylpropyl)amine, bis(3-trimethoxysilylpropyl)-[3-(2,2-dimethoxy-1-aza-2-silacyclopentane)propyl]amine, bis[3-(2,2-dimethoxy-1-aza-2-silacyclopentane)propyl]-(3-trimethoxysilylpropyl)amine, tris[3-(2,2-dimethoxy-1-aza-2-silacyclopentane)propyl]amine, tris(3-ethoxysilylpropyl)amine, bis(3-triethoxysilylpropyl)-[3-(2,2-diethoxy-1-aza-2-silacylopentane)propyl]amine, bis[3-(2,2-diethoxy-1-aza-2-silacyclopentane)propyl]-(3-triethoxysilylpropyl)amine, tris[3-(2,2-diethoxy-1-aza-2-silacyclopentane)propyl]amine, tetrakis(3-trimethoxysilylpropyl)-1,3-propanediamine, tris(3-trimethoxysilylpropyl)-[3-(2,2-dimethoxy-1-aza-2-silacyclopentane)propyl]-1,3-propanediamine, bis(3-trimethoxysilylpropyl)-bis[3-(2,2-dimethoxy-1-aza-2-silacyclopentane)propyl]-1,3-propanedimane, tris[3-(2,2-dimethoxy-1-aza-2-silacyclopentane)propyl]-(3-trimethoxysilylpropyl)1,3-propanediamine, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-azacyclopentane)propyl]-1,3-propanediamine, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-propanediamine, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-propanediamine, tris[3-(2,2-dimethoxy-1-aza-2-silacyclopentane)propyl]-[3-(1-methoxy-2-trimethylsilyl-1-sila-2-azacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane)propyl]-1,3-propanediamine, bis(3-triethoxysilylpropyl)-bis[3-(2,2-diethoxy-1-aza-2-silacyclopentane)propyl]-1,3-propanediamine, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-bisaminomethylcyclohexane, tris[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, tetrakis(3-trimethoxysilylpropyl)-1,6-hexamethylenediamine and pentakis(3-trimethoxysilylpropyl)-diethylenetriamine.

Examples of the coupling agent to be used when A in formula (VI) is represented by formula (III) include, but are not limited to, tris(3-trimethoxysilylpropyl)-methyl-1,3-propanediamine, bis(2-trimethoxysilylpropyl)-[3-(2,2-dimethoxy-1-aza-2-silacyclopentane)propyl]-methyl-1,3-propanediamine, bis[3-(2,2-dimethoxy-1-aza-2-silacyclopentane)propyl]-(3-trimethoxysilylpropyl)-methyl-1,3-propanediamine, tris(3-triethoxysilylpropyl)-methyl-1,3-propanediamine, bis(2-triethoxysilylpropyl)-[3-(2,2-diethoxy-1-aza-2-silacyclopentane)propyl]-methyl-1,3-propanediamine, bis[3-(2,2-diethoxy-1-aza-2-silacyclopentane)propyl]-(3-triethoxysilylpropyl)-methyl-1,3-propanediamine, $N^1,N^{1'}$-(propane-1,3-diyl)bis($N^1$-methyl-$N^3$,$N^3$-bis(3-(trimethoxysilyl)propyl)-1,3-propanediamine) and N1-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

Examples of the coupling agent to be used when A in formula (VI) is represented by formula (IV) include, but are not limited to, tetrakis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl]silane, bis(3-trimethoxysilylpropyl)-bis[3-(2,2-dimethoxy-1-aza-2-silacyclopentane)propyl]silane, (3-trimethoxysilyl)-[3-(1-methoxy-2-trimethylsilyl-1-sila-2-azacyclopentane)-bis[3-(2,2-dimethoxy-1-aza-2-silacyclopentane)propyl]

silane, bis[3-(1-methoxy-2-trimethylsilyl-1-sila-2-azacyclopentane)-bis[3-(2,2-dimethoxy-1-aza-2-silacyclopentane) propyl]silane, tris(3-trimethoxysilylpropyl)-[3-(2,2-dimethoxy-1-aza-2-silacyclopentane)propyl]silane, bis(3-trimethoxysilylpropyl)-[3-(1-methoxy-2-trimethylsilyl-1-sila-2-azacyclopentane)propyl]-[3-(2,2-dimethoxy-1-aza-2-silacyclopentane)propyl]silane, bis[3-(1-methoxy-2-trimethylsilyl-1-sila-2-azacyclopentane)propyl]-bis(3-trimethoxysilylpropyl)silane, and bis(3-trimethoxysilylpropyl)-bis[3-(1-methoxy-2-methyl-1-sila-2-azacyclopentane)propyl]silane.

Examples of the coupling agent to be used when A in formula (VI) is represented by formula (V) include, but are not limited to, 3-tris[2-(2,2-dimethoxy-1-aza-2-silacyclopentane)ethoxy]silyl-1-(2,2-dimethoxy-1-aza-2-silacyclopentane)propane, and 3-tris[2-(2,2-dimethoxy-1-aza-2-silacyclopentane)ethoxy]silyl-1-trimethoxysilylpropane.

In formula (VI), A is preferably represented by formula (II) or formula (III), and k represents 0 (zero). Such a coupling agent tends to be easily available, and the abrasion resistance and the low hysteresis loss performance obtained when the modified conjugated diene-based polymer is made into a vulcanizate tend to be more excellent. Examples of such a coupling agent include, but are not limited to, bis(3-trimethoxysilylpropyl)-[3-(2,2-dimethoxy-1-aza-2-silacyclopentane)propyl]amine, tris(3-trimethoxysilylpropyl) amine, tris(3-triethoxysilylpropyl)amine, tris(3-trimethoxysilylpropyl)-[3-(2,2-dimethoxy-1-aza-2-silacyclopentane) propyl]-1,3-propanediamine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, tris(3-trimethoxysilylpropyl)-methyl-1,3-propanediamine, and bis[3-(2,2-dimethoxy-1-aza-2-silacyclopentane)propyl]-(3-trismethoxysilylpropyl)-methyl-1,3-propanediamine.

More preferably, in formula (VI), A is represented by formula (II) or formula (III) and k represents 0 (zero), and in formula (II) or formula (III), a represents an integer of 2 to 10. Thus, the abrasion resistance and the low hysteresis loss performance obtained when vulcanized tend to be more excellent. Examples of such a coupling agent include, but are not limited to, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl)propyl)amino)propyl)-$N^1$-methyl-$N^3$-(3-(methyl(3-(trimethoxysilyl)propyl)amino) propyl)-$N^3$-(3-(trimethoxysilyl)propyl)-1,3-propanediamine.

An addition amount of the compound represented by formula (VI) as the coupling agent can be adjusted so that the reaction can be performed with a mole number ratio between the conjugated diene-based polymer and the coupling agent set to a desired stoichiometric ratio, and thus, a desired branching degree tends to be attained. A specific mole number of the polymerization initiator, based on the mole number of the coupling agent, is preferably 5.0-fold mole or more, and more preferably 6.0-fold mole or more. In this case, in formula (VI), the number of functional groups in the coupling agent ((m−1)×i+p×j+k) is preferably an integer of 5 to 10, and more preferably an integer of 6 to 10.

As the number of functional groups in the compound represented by formula (VI) is larger, the branching degree of the resultant modified conjugated diene-based polymer is more likely to be shifted from a desired value if the addition amount of the coupling agent cannot be controlled in a desired range in the reaction step. Accordingly, the addition amount of the coupling agent is preferably suitably controlled. In order to suitably control the addition amount of the coupling agent, for example, a method in which the coupling agent is diluted before the addition is preferably employed. If the shift in the addition amount is the same, a shift between the mole number of the conjugated diene-based polymer and the mole number of the coupling agent tends to be smaller when it is diluted. Besides, a water content of a solvent used for the dilution is preferably 100 mass ppm or less, more preferably 50 mass ppm or less, further preferably 30 mass ppm or less, and further more preferably 10 mass ppm or less. If the water content of the solvent used for the dilution is 100 mass ppm or less, the coupling agent and water are reacted to reduce the number of the functional groups in the coupling agent, and therefore, there is a tendency that the shift between the mole number of the conjugated diene-based polymer and the mole number of the coupling agent can be suppressed.

In order to obtain the modified conjugated diene-based polymer comprising the specific high molecular weight component of the present embodiment, the molecular weight distribution (Mw/Mn) of the conjugated diene-based polymer may be preferably 1.5 or more and 2.5 or less, and more preferably 1.8 or more and 2.2 or less. Besides, a single peak is preferably detected in the molecular weight curve of the resultant modified conjugated diene-based polymer obtained by the GPC. In this case, the workability and the abrasion resistance corresponding to the object of the present embodiment tend to be more excellent.

Assuming that the peak molecular weight, obtained by the GPC, of the modified conjugated diene-based polymer is $Mp_1$ and that the peak molecular weight of the conjugated diene-based polymer is $Mp_2$, the following formula preferably holds:

$$(Mp_1/Mp_2)<1.8\times10-12\times(Mp_2-120\times10^4)2+2$$

More preferably, $Mp_2$ is $20\times10^4$ or more and $80\times10^4$ or less, and $Mp_1$ is $30\times10^4$ or more and $150\times10^4$ or less. The values of $Mp_1$ and $Mp_2$ are obtained by a method described in the examples below.

In the modified conjugated diene-based polymer of the present embodiment, a ratio of a coupling polymer in the modified conjugated polymer is expressed by a modification percentage. The modification percentage is preferably 30% by mass or more, more preferably 50% by mass or more, and further preferably 70% by mass or more. If the modification percentage is 30% by mass or more, there is a tendency that the workability obtained when used for obtaining a vulcanizate is more excellent and that the abrasion resistance and the low hysteresis loss performance obtained when in the form of a vulcanizate are more excellent. Incidentally, in the present embodiment, the ratio of the coupling polymer has the same meaning as the modification percentage when a functional group comprising nitrogen and silicon is comprised in the coupling residue. The modification percentage is measured by a method described in the examples below.

In the present embodiment, after the reaction step or before the reaction step, a condensation reaction step of performing a condensation reaction in the presence of a condensation accelerator can be performed.

A method for hydrogenating the conjugated diene portion of the modified conjugated diene-based polymer of the present embodiment is not especially limited, and any of known methods can be employed. As a suitable hydrogenation method, a method in which the hydrogenation is performed by blowing gaseous hydrogen into the polymer solution in the presence of a catalyst can be employed. Examples of the catalyst include heterogeneous catalysts such as a catalyst comprising a noble metal supported on a porous inorganic substance; and homogenous catalysts such as a catalyst obtained by reacting a solubilized salt of nickel, cobalt or the like with organic aluminum or the like, and a catalyst using metallocene such as titanocene. Among these catalysts, from the viewpoint that a mild hydrogenation condition can be selected, a titanocene catalyst is preferably used. In addition, hydrogenation of an aromatic group can be performed by using a noble metal-supported catalyst.

Specific examples of the hydrogenation catalyst include, but are not limited to, (1) a supported heterogeneous hydrogenation catalyst obtained by supporting a metal such as Ni, Pt, Pd or Ru on carbon, silica, alumina or diatomite, (2) what is called a ziegler catalyst using an organic acid salt of Ni, Co, Fe, Cr or the like, or a transition metal salt such as acetylacetone salt, and a reducing agent such as organic aluminum, and (3) what is called an organic metal complex such as an organic metal compound of Ti, Ru, Rh or Zr. Furthermore, examples of the hydrogenation catalyst include known hydrogenation catalysts described in, for example, Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, Japanese Patent Publication No. 2-9041 and Japanese Patent Laid-Open No. 8-109219. A preferable hydrogenation catalyst is a reaction mixture of a titanocene compound and a reducing organic metal compound.

In the method for producing the modified conjugated diene-based polymer of the present embodiment, a terminator, a neutralizer or the like may be added if necessary to the resultant copolymer solution after the reaction step. Examples of the terminator include, but are not limited to, water; and alcohols such as methanol, ethanol and isopropanol. Examples of the neutralizer include, but are not limited to, carboxylic acids such as stearic acid, oleic acid and versatic acid (a mixture of highly branched carboxylic acids having 9 to 11 carbon atoms, mainly 10 carbon atoms); and an aqueous solution of an inorganic acid, and a carbon dioxide gas.

To the modified conjugated diene-based polymer of the present embodiment, from the viewpoint of preventing gel formation after the polymerization and of improving stability in the processing, a stabilizer for rubber is preferably added. As the stabilizer for rubber, any of known stabilizers, not limited to the following, can be used, and preferable examples include antioxidants such as 2,6-di-tert-butyl-4-hydroxytoluene (BHT), n-octadecyl-3-(4'-hydroxy-3',5'-di-tert-butylphenol)propionate, and 2-methyl-4,6-bis[(octylthio)methyl]phenol.

In order to further improve the workability of the modified conjugated diene-based polymer of the present embodiment, an extender oil may be added to the modified conjugated diene-based copolymer if necessary. A preferable example of a method for adding an extender oil to the modified conjugated diene-based polymer includes, but is not limited to, a method in which an extender oil is added to the polymer solution to be mixed, and the resultant oil-extended copolymer solution is desolvated. Examples of the extender oil include an aroma oil, a naphthenic oil and a paraffin oil. Among these oils, from the viewpoint of environmental safety, oil bleeding prevention and wet grip characteristics, an aroma-alternative oil comprising 3% by mass or less of a polycyclic aromatic (PCA) component according to the IP 346 is preferred. Examples of the aroma-alternative oil include TDAE (Threated Distillate Aromatic Extracts), MES (Mild Extraction Solvate) and the like mentioned in Kautschuk Gummi Kunststoffe 52 (12) 799 (1999), and RAE (Residual Aromatic Extracts). The amount of the extender oil to be added is not especially limited, and is preferably 10 parts by mass or more and 60 parts by mass or less, and more preferably 20 parts by mass or more and 37.5 parts by mass or less based on 100 parts by mass of the modified conjugated diene-based polymer.

As a method for recovering, from the polymer solution, the modified conjugated diene-based polymer of the present embodiment, any of known methods can be employed. Examples of the method include a method in which the polymer is filtered off after separating the solvent by steam stripping and the resultant is dehydrated and dried to recover the polymer, a method in which the solution is concentrated in a flashing tank and the resultant is devolatilized by a vent extruder or the like, and a method in which the solution is directly devolatilized using a drum dryer or the like.

The modified conjugated diene-based polymer of the present embodiment is suitably used as a vulcanizate. Examples of the vulcanizate include a tire, a hose, a shoe sole, an anti-vibration rubber, a vehicle component and a seismic isolation rubber as well as high-impact polystyrene and a resin reinforcing rubber for an ABS resin or the like. In particular, the modified conjugated diene-based polymer is suitably used as a tread rubber composition for a tire. The vulcanizate can be obtained, for example, by kneading the modified conjugated diene-based polymer of the present embodiment and, if necessary, an inorganic filler such as a silica-based inorganic filler or carbon black, a rubber-like polymer different from the modified conjugated diene-based polymer of the present embodiment, a silane coupling agent, a rubber softener, a vulcanizing agent, a vulcanization accelerator, a vulcanization aid or the like to obtain a modified conjugated diene-based polymer composition, and vulcanizing the thus obtained composition by heating.

[Rubber Composition]

A rubber composition of the present embodiment comprises a rubber component and a filler in an amount of 5.0 parts by mass or more and 150 parts by mass or less based on 100 parts by mass of the rubber component. Besides, the rubber component comprises the above-described modified conjugated diene-based polymer in an amount of 10% by mass or more based on the total amount (100% by mass) of the rubber component. Furthermore, the filler preferably comprises a silica-based inorganic filler. If a silica-based inorganic filler is dispersed therein, the rubber composition tends to be more excellent in the workability obtained when used for obtaining a vulcanizate and be more excellent in the balance between the low hysteresis loss property and the wet skid resistance and the abrasion resistance obtained when in the form of a vulcanizate, and in the fracture strength. If the rubber composition of the present embodiment is to be used as a vulcanized rubber for a tire, a vehicle component such as an anti-vibration rubber or for shoes or the like, a silica-based inorganic filler is preferably comprised.

In the rubber composition, a rubber-like polymer different from the modified conjugated diene-based polymer of the present embodiment (hereinafter simply referred to as the "rubber-like polymer") can be used in combination with the branched modified diene-based polymer of the present embodiment. Examples of such a rubber-like polymer include, but are not limited to, a conjugated diene-based polymer or a hydrogenated product thereof, a random copolymer of a conjugated diene-based compound and a vinyl aromatic compound or a hydrogenated product thereof, a block copolymer of a conjugated diene-based compound and a vinyl aromatic compound or a hydrogenated product thereof, a non-diene-based polymer and a natural rubber. Specific examples of the rubber-like polymer include, but are not limited to, a butadiene rubber or a hydrogenated product thereof, an isoprene rubber or a hydrogenated product thereof, styrene-based elastomers such as a styrene-butadiene rubber or a hydrogenated product thereof, a styrene-butadiene block copolymer or a hydrogenated product thereof, and a styrene-isoprene block copolymer or a hydrogenated product thereof, and an acrylonitrile-butadiene rubber or a hydrogenated product thereof.

Examples of the non-diene-based polymer include, but are not limited to, olefin-based elastomers such as an ethylene-propylene rubber, an ethylene-propylene-diene rubber, an ethylene-butene-diene rubber, an ethylene-butene rubber, an ethylene-hexene rubber and an ethylene-octene rubber, a butyl rubber, a brominated butyl rubber, an acrylic rubber, a fluorine rubber, a silicone rubber, a chlorinated polyethylene rubber, an epichlorohydrin rubber, an α,β-unsaturated nitrile-acrylic acid ester-conjugated diene copolymer rubber, a urethane rubber and a polysulfide rubber.

Examples of the natural rubber include, but are not limited to, smoked sheets of RSS Nos. 3 to 5, SMR and epoxidized natural rubber.

The above-described various rubber-like polymers may be in the form of a modified rubber imparted with a functional group having polarity such as a hydroxyl group or an amino group. For use in a tire, a butadiene rubber, an isoprene rubber, a styrene-butadiene rubber, a natural rubber and a butyl rubber are preferably used.

The weight-average molecular weight of the rubber-like polymer is, from the viewpoint of balance between the performance and the processing characteristics, preferably 2000 or more and 2000000 or less, and more preferably 5000 or more and 1500000 or less. Besides, a rubber-like polymer having a low molecular weight, namely, what is called a liquid rubber, can be used. One of these rubber-like polymers may be singly used, or two or more of these may be used together.

When the rubber composition comprises the modified conjugated diene-based polymer of the present embodiment and the rubber-like polymer, a content (in a mass ratio) of the modified conjugated diene-based polymer to the rubber-like polymer is, in terms of (the modified conjugated diene-based polymer/the rubber-like polymer), preferably 10/90 or more and 100/0 or less, more preferably 20/80 or more and 90/10 or less, and further preferably 50/50 or more and 80/20 or less. Accordingly, the rubber component comprises, based on the total amount (100 parts by mass) of the rubber component, the modified conjugated diene-based polymer in an amount of preferably 10 parts by mass or more and 100 parts by mass or less, more preferably 20 parts by mass or more and 90 parts by mass or less, and further preferably 50 parts by mass or more and 80 parts by mass or less. If the ratio of (the modified conjugated diene-based polymer/the rubber-like polymer) falls in the above-described range, the balance between the low hysteresis loss property and the wet skid resistance and the abrasion resistance obtained when in the form of a vulcanizate are excellent, and the fracture strength is also satisfactory.

Examples of the filler include, but are not limited to, a silica-based inorganic filler, carbon black, a metal oxide and a metal hydroxide. Among these, a silica-based inorganic filler is preferred. One of these may be singly used, or two or more of these may be used together.

A content of the filler in the rubber composition is 5.0 parts by mass or more and 150 parts by mass or less, and preferably 20 parts by mass or more and 100 parts by mass or less based on 100 parts by mass of the rubber component comprising the modified conjugated diene-based polymer. From the viewpoint of exhibiting the effect of the filler addition, the content of the filler is 5.0 parts by mass or more, and from the viewpoint that the filler is sufficiently dispersed to attain practically sufficient workability and mechanical strength of the composition, the content is 150 parts by mass or less.

The silica-based inorganic filler is not especially limited, any of known fillers can be used, a solid particle comprising $SiO_2$ or $Si_3Al$ as a structural unit is preferred, and a solid particle comprising $SiO_2$ or $Si_3Al$ as a principal component of a structural unit is more preferred. Here, the principal component refers to a component comprised in the silica-based inorganic filler in an amount of 50% by mass or more, preferably 70% by mass or more, and more preferably 80% by mass or more.

Specific examples of the silica-based inorganic filler include, but are not limited to, silica, clay, talc, mica, diatomite, wollastonite, montmorillonite, zeolite and inorganic fibrous substances such as glass fiber. Besides, examples include a silica-based inorganic filler having a hydrophobized surface, and a mixture of a silica-based inorganic filler and an inorganic filler excluding silica. Among these, from the viewpoint of the strength and the abrasion resistance, silica and glass fiber are preferred, and silica is more preferred. Examples of the silica include dry silica, wet silica and synthetic silicate silica. Among these silica, wet silica is preferred from the viewpoint that it is excellent in the effect of improving the fracture characteristics and in the balance in the wet skid resistance.

From the viewpoint of obtaining practically good abrasion resistance and fracture characteristics of the rubber composition, a nitrogen adsorption specific surface area, obtained by the BET adsorption method, of the silica-based inorganic filler is preferably 100 $m^2/g$ or more and 300 $m^2/g$ or less, and more preferably 170 $m^2/g$ or more and 250 $m^2/g$ or less. Besides, a silica-based inorganic filler having a comparatively small specific surface area (for example, a specific surface area of 200 $m^2/g$ or less) and a silica-based inorganic filler having a comparatively large specific surface area (for example, a specific surface area of 200 $m^2/g$ or more) can be used in combination if necessary. In the present embodiment, if a silica-based inorganic filler having a comparatively large specific surface area (of, for example, 200 $m^2/g$ or more) is used in particular, the modified conjugated diene-based polymer tends to be well balanced between good fracture characteristics and the low hysteresis loss property because the dispersibility of silica can be thus so improved that an effect of improving the abrasion resistance is exhibited in particular.

A content of the silica-based inorganic filler in the rubber composition is 5.0 parts by mass or more and 150 parts mass, and preferably 20 parts by mass or more and 100 parts by mass or less based on 100 parts by mass of the rubber component comprising the modified conjugated diene-based polymer. From the viewpoint of exhibiting the effect of the inorganic filler addition, the content of the silica-based inorganic filler is 5.0 parts by mass or more, and from the viewpoint that the inorganic filler is sufficiently dispersed to obtain practically sufficient workability and mechanical strength of the composition, the content is 150 parts by mass or less.

Examples of the carbon black include, but are not limited to, carbon blacks of SRF, FEF, HAF, ISAF and SAF classes. Among these, a carbon black having a nitrogen adsorption specific surface area of 50 $m^2/g$ or more and dibutyl phthalate (DBP) oil absorption of 80 mL/100 g or less is preferred.

A content of the carbon black is preferably 0.5 parts by mass or more and 100 parts by mass or less, more preferably 3.0 parts by mass or more and 100 parts by mass or less, and further preferably 5.0 parts by mass or more and 50 parts by mass or less based on 100 parts by mass of the rubber component comprising the modified conjugated diene-based polymer. From the viewpoint of exhibiting performances required in use as a tire or the like such as dry grip performance and conductivity, the content of the carbon black is preferably 0.5 parts by mass or more, and from the viewpoint of dispersibility, the content is preferably 100 parts by mass or less.

The metal oxide refers to a solid particle comprising a principal component of a constituent unit represented by MxOy (wherein M represents a metal atom, and x and y each independently represent an integer of 1 to 6). Examples of the metal oxide include, but are not limited to, alumina, titanium oxide, magnesium oxide and zinc oxide. Examples of the metal hydroxide include, but are not limited to, aluminum hydroxide, magnesium hydroxide and zirconium hydroxide.

The rubber composition may comprise a silane coupling agent. The silane coupling agent is preferably a compound that has a function to make close the interaction between the rubber component and the inorganic filler, has a group having affinity with or a binding property to both of the rubber component and the silica-based inorganic filler, and comprises, in one molecule, a sulfur bond portion and an alkoxysilyl group or silanol group portion. Examples of such a compound include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

A content of the silane coupling agent is preferably 0.1 parts by mass or more and 30 parts by mass or less, more preferably 0.5 parts by mass or more and 20 parts by mass or less, and further preferably 1.0 part by mass or more and 15 parts by mass or less based on 100 parts by mass of the inorganic filler. If the content of the silane coupling agent falls in the aforementioned range, there is a tendency that the effect of the addition of the silane coupling agent can be more conspicuous.

The rubber composition may comprise a rubber softener from the viewpoint of improvement of the workability. As the rubber softener, a mineral oil or a liquid or low molecular weight synthetic softer is suitably used. A mineral oil-based rubber softener, which is used for softening, expanding and improving workability of a rubber and is designated as a process oil or an extender oil, is a mixture of an aromatic ring, a naphthene ring and a paraffin chain, and one in which the number of carbon atoms of the paraffin chain is 50% or more of the number of all carbon atoms is designated as a paraffin-based softener, one in which the number of carbon atoms of the naphthene ring is 30% or more and 45% or less of the number of all carbon atoms is designated as a naphthene-based softener, and one in which the number of aromatic carbon atoms exceeds 30% of the number of all carbon atoms is designated as an aromatic-based softener. If the conjugated diene-based polymer of the present embodiment is a copolymer of a conjugated diene compound and a vinyl aromatic compound, a rubber softener to be used is preferably one comprising an appropriate aromatic content because such a softener tends to fit with the copolymer.

A content of the rubber softener is preferably 0 part by mass or more and 100 parts by mass or less, more preferably 10 parts by mass or more and 90 parts by mass or less, and further preferably 30 parts by mass or more and 90 parts by mass or less based on 100 parts by mass of the rubber component comprising the modified conjugated diene-based polymer. If the content of the rubber softener is 100 parts by mass or less based on 100 parts by mass of the rubber component, there is a tendency that the bleeding out is suppressed and the stickiness of the surface of the rubber composition is suppressed.

Examples of a method for mixing the modified conjugated diene-based polymer and another rubber-like polymer, a silica-based inorganic filler, carbon black or another filler, a silane coupling agent, and an additive such as a rubber softener include, but are not limited to, a melt-kneading method using a general mixer such as an open roll, a banbury mixer, a kneader, a single shaft screw extruder, a twin shaft screw extruder or a multi-shaft screw extruder, and a method in which the respective components are melted and mixed followed by removal of a solvent by heating. Among these methods, the melt-kneading method using a roll, a banbury mixer, a kneader or an extruder is preferred from the viewpoint of productivity and high kneadability. Besides, either of a method in which the rubber component and another filler, a silane coupling agent and an additive are kneaded all together or a method in which the components are mixed dividedly in plural times is applicable.

The rubber composition may be a vulcanized composition having been vulcanized with a vulcanizing agent. Examples of the vulcanizing agent include, but are not limited to, radical generators such as organic peroxides and azo compounds, oxime compounds, nitroso compounds, polyamine compounds, sulfur and sulfur compounds. Examples of the sulfur compounds include sulfur monochloride, sulfur dichloride, disulfide compounds and high molecular weight polysulfide compounds. A content of the vulcanizing agent is preferably 0.01 parts by mass or more and 20 parts by mass or less, and more preferably 0.1 parts by mass or more and 15 parts by mass or less based on 100 parts by mass of the rubber component. As a vulcanizing method, any of known methods is applicable, and a vulcanization temperature is preferably 120° C. or more and 200° C. or less, and more preferably 140° C. or more and 180° C. or less.

For the vulcanization, a vulcanization accelerator may be used if necessary. As the vulcanization accelerator, any of known materials can be used, and examples include, but are not limited to, sulphenamide-based, guanidine-based, thiuram-based, aldehyde-amine-based, aldehyde-ammonia-based, thiazole-based, thiourea-based and dithiocarbamate-based vulcanization accelerators. Besides, examples of a vulcanization aid include, but are not limited to, zinc oxide and stearic acid. A content of the vulcanization accelerator is preferably 0.01 parts by mass or more and 20 parts by mass or less, and more preferably 0.1 parts by mass or more and 15 parts by mass or less based on 100 parts by mass of the rubber component.

The rubber composition may comprise, as long as the object of the present embodiment is not impaired, various additives such as other softener and filler excluding those described above, a heat resistance stabilizer, an antistatic agent, a weathering stabilizer, an anti-ageing agent, a colorant and a lubricant. As another softener, any of known softeners can be used. Specific examples of another filler include calcium carbonate, magnesium carbonate, aluminum sulfate and barium sulfate. As each of the heat resistance stabilizer, the antistatic agent, the weathering stabilizer, the anti-ageing agent, the colorant and the lubricant, any of known materials can be used.

[Tire]

The modified diene-based polymer composition of the present embodiment is suitably used as a rubber composition for a tire. In other words, a tire of the present embodiment comprises the rubber composition.

The rubber composition for a tire of the present embodiment is applicable to, but not limited to, various tires such as a fuel-efficient tire, an all-season tire, a high-performance tire and a studless tire; and various tire portions such as a tread, a carcass, a sidewall and a bead. In particular, since the rubber composition for a tire is excellent in the balance between the low hysteresis loss property and the wet skid resistance obtained when in the form of a vulcanizate and in the abrasion resistance, it is more suitably used as a tread of a fuel-efficient tire or a high-performance tire.

EXAMPLES

The present embodiment will now be described in more detail with reference to specific examples and comparative examples, and it is noted that the present embodiment is not limited to the following examples and comparative examples unless beyond the scope thereof. Various physical properties mentioned in the examples and comparative examples below were measured by the following methods.

(Physical Property 1) Amount of Bound Styrene

A modified conjugated diene-based polymer was used as a sample, 100 mg of the sample was dissolved in chloroform to be diluted to 100 mL, and the resultant was used as a measurement sample. Based on the absorption of a phenyl group of styrene at the ultraviolet absorption wavelength (in the vicinity of 254 nm), the amount of bound styrene (% by mass) based on 100% by mass of the modified conjugated diene-based polymer used as the sample was measured (spectrophotometer "UV-2450" manufactured by Shimadzu Corporation).

(Physical Property 2) Microstructure of Butadiene Portion (Amount of 1,2-Vinyl Bond)

A modified conjugated diene-based polymer was used as a sample, 50 mg of the sample was dissolved in 10 mL of carbon disulfide, and the resultant was used as a measurement sample. A solution cell was used to measure an infrared spectrum in a range of 600 to 1000 cm$^{-1}$, and in accordance with a calculation formula of the Hampton method (a method described by R. R. Hampton, Analytical Chemistry 21, 923 (1949)) based on absorbance at a prescribed wavelength, a microstructure of a butadiene portion, namely, the amount of a 1,2-vinyl bond (mol %) was obtained (Fourier transform infrared spectrophotometer "FT-IR230" manufactured by JASCO Corporation).

(Physical Property 3) Molecular Weights

Measurement Conditions 1: A conjugated diene-based polymer or a modified conjugated diene-based polymer was used as a sample to measure a chromatogram using a GPC measurement apparatus (trade name "HLC-8320GPC" manufactured by Tosoh Corporation) including a series of three columns using a polystyrene-based gel as a filler and using an RI detector (trade name "HLC8020" manufactured by Tosoh Corporation), and on the basis of a calibration curve obtained using standard polystyrene, a weight-average molecular weight (Mw), a number-average molecular weight (Mn), a molecular weight distribution (Mw/Mn), a peak top molecular weight ($Mp_1$) of the modified conjugated diene-based polymer, a peak top molecular weight ($Mp_2$) of the conjugated diene-based polymer, a ratio therebetween ($Mp_1/Mp_2$), and a ratio of a molecular weight of $200 \times 10^4$ or more and $500 \times 10^4$ or less were obtained. As an eluent, THF (tetrahydrofuran) containing 5 mmol/L of triethylamine was used. As the columns, three columns available under the trade name "TSKgel SuperMultpore HZ-H" manufactured by Tosoh Corporation were connected to one another, and a guard column available under the trade name "TSKguardcolumn SuperMP(HZ)-H" manufactured by Tosoh Corporation was connected to a previous stage of these. Ten (10) mg of the sample for the measurement was dissolved in 10 mL of THF to obtain a measurement solution, and 10 µL of the measurement solution was injected into the GPC measurement apparatus for performing the measurement under conditions of an oven temperature of 40° C. and a THF flow rate of 0.35 mL/min. Among various samples subjected to the measurement under the measurement conditions 1, a sample found to have a value of the molecular weight distribution (Mw/Mn) less than 1.6 was subjected to measurement under the following measurement conditions 2. With respect to samples each subjected to the measurement under the measurement conditions 1 and found to have a value of the molecular weight distribution of 1.6 or more, results of the measurement performed under the measurement conditions 1 are shown in Tables 1 and 2.

Measurement Conditions 2: A conjugated diene-based polymer or a modified conjugated diene-based polymer was used as a sample to measure a chromatogram using a GPC measurement apparatus including a series of three columns using a polystyrene-based gel as a filler, and on the basis of a calibration curve obtained using standard polystyrene, a weight-average molecular weight (Mw), a number-average molecular weight (Mn), a peak top molecular weight ($Mp_1$) of the modified conjugated diene-based polymer, a peak top molecular weight ($Mp_2$) of the conjugated diene-based polymer, a ratio therebetween ($Mp_1/Mp_2$), and a ratio of a molecular weight of $200 \times 10^4$ or more and $500 \times 10^4$ or less were obtained. As an eluent, THF containing 5 mmol/L of triethylamine was used. As columns, a guard column available under the trade name "TSKguardcolumn SuperH-H" manufactured by Tosoh Corporation and columns available under the trade names "TSKgel SuperH5000", "TSKgel SuperH6000" and "TSKgel SuperH7000" manufactured by Tosoh Corporation were used. The measurement was performed under conditions of an oven temperature of 40° C. and a THF flow rate of 0.6 mL/min, and an RI detector (trade name "HLC8020" manufactured by Tosoh Corporation) was used. Ten (10) mg of the sample for the measurement was dissolved in 20 mL of THF to obtain a measurement solution, and 20 µL of the measurement solution was injected into the GPC measurement apparatus for performing the measurement. With respect to samples each subjected to the measurement under the measurement conditions 1 and found to have a value of the molecular weight distribution less than 1.6, results of the measurement performed under the measurement conditions 2 are shown in Tables 1 and 2.

The peak top molecular weights ($Mp_1$ and $Mp_2$) were obtained as follows in both the measurements performed under the measurement conditions 1 and 2. On a GPC curve obtained by the measurement, a peak detected as a highest molecular weight component was selected. With respect to the selected peak, a molecular weight corresponding to the maximum value of the peak was calculated to be defined as a peak top molecular weight. Besides, in both the measurements performed under the measurement conditions 1 and 2, the ratio of the molecular weight of $200 \times 10^4$ or more and $500 \times 10^4$ or less was calculated, based on an integral molecular weight distribution curve, by subtracting a ratio occupied, in the whole molecular weight, by a molecular weight lower than $200\times10^4$ from a ratio occupied by a molecular weight of $500\times10^4$ or less.

(Physical Property 4) Shrinking Factor (g')

Measurement was performed by using a modified conjugated diene-based polymer as a sample, using a GPC measurement apparatus (trade name "GPCmax VE-2001" manufactured by Malvern) including a series of three columns using a polystyrene-based gel as a filler, and using three detectors connected in order of a light scattering detector, an RI detector and a viscosity detector (trade name "TDA305" manufactured by Malvern), and on the basis of standard polystyrene, an absolute molecular weight was obtained based on results obtained by the light scattering detector and the RI detector, and an intrinsic viscosity was obtained based on results obtained by the RI detector and the viscosity detector. Assuming that a straight chain polymer has an intrinsic viscosity $[\eta]$ complying with the formula of intrinsic viscosity $[\eta]=-3.883$ M0.771, a shrinking factor (g') as a ratio in the intrinsic viscosity corresponding to each molecular weight was calculated. As an eluent, THF containing 5 mmol/L of triethylamine was used. As columns, columns available under the trade names "TSKgel G4000HXL", "TSKgel G5000HXL" and "TSKgel G6000HXL" manufactured by Tosoh Corporation connected to one another were used. Twenty (20) mg of the sample for the measurement was dissolved in 10 mL of THF to obtain a measurement solution, and 100 µL of the measurement solution was injected into the GPC measurement apparatus for performing the measurement under conditions of an oven temperature of 40° C. and a THF flow rate of 1 mL/min.

(Physical Property 5) Mooney Viscosity of Polymer

A conjugated diene-based polymer or a modified conjugated diene-based polymer was used as a sample, and a Mooney viscosity was measured using a Mooney viscometer (trade name "VR1132" manufactured by Ueshima Seisakusho Co., Ltd.) and using an L-type rotor in accordance with JIS K6300. A measurement temperature was set to 110° C. when the sample was a conjugated diene-based polymer, and was set to 100° C. when the sample was a modified conjugated diene-based polymer. First, the sample was preheated for 1 minute at a test temperature, the rotor was rotated at 2 rpm, and a torque measured 4 minutes after was defined as a Mooney viscosity ($ML_{(1+4)}$).

(Physical Property 6) Glass Transition Temperature (Tg)

A modified conjugated diene-based polymer was used as a sample to record a DSC curve in accordance with ISO 22768:2006 using a differential scanning calorimeter "DSC3200S" manufactured by MAC Science Co., Ltd. under a flow of helium at 50 mL/min during temperature increase from −100° C. at a rate of 20° C./min, and a peak top (an inflection point) of the thus obtained DSC differential curve was defined as a glass transition temperature.

(Physical Property 7) Modification Percentage

A modified conjugated diene-based polymer was used as a sample, and measurement was performed by applying a characteristic that a modified basic polymer component adsorbs to a GPC column using a silica-based gel as a filler. A chromatogram obtained by measurement using a polystyrene-based column and a chromatogram obtained by measurement using a silica-based column were obtained by using a sample solution containing the sample and low molecular weight internal standard polystyrene, and based on a difference between these chromatograms, an adsorption amount to the silica-based column was measured to obtain a modification percentage. Specifically, the measurement was performed as described below. Besides, as a result of the measurement under the measurement conditions 1 of (Physical Property 3) described above, the sample found to have a value of the molecular weight distribution of 1.6 or more were subjected to the measurement under measurement conditions 3 described below, the samples found to have a value of the molecular weight distribution less than 1.6 were subjected to the measurement under conditions 4 described below, and results are shown in Tables 1 and 2.

Preparation of Sample Solution: Ten (10) mg of a sample and 5 mg of standard polystyrene were dissolved in 20 mL of THF to obtain a sample solution.

GPC Measurement Conditions using Polystyrene-based Column (Measurement Conditions 3): An apparatus available under the trade name of "HLC-8320GPC" manufactured by Tosoh Corporation was used, THF containing 5 mmol/L of triethylamine was used as an eluent, and 10 µL of the sample solution was injected into the apparatus to obtain a chromatogram by using an RI detector under conditions of a column oven temperature of 40° C. and a THF flow rate of 0.35 mL/min. Three columns available under the trade name "TSKgel SuperMultiporeHZ-H" manufactured by Tosoh Corporation were connected to one another, and a guard column available under the trade name "TSKguardcolumn SuperMP(HZ)-H" manufactured by Tosoh Corporation was connected to a previous stage of these.

Measurement Conditions 4: THF containing 5 mmol/L of triethylamine was used as an eluent, and 20 µL of the sample solution was injected into the apparatus for the measurement. As columns, a guard column available under the trade name "TSKguardcolumn SuperH-H" manufactured by Tosoh Corporation, and columns available under the trade names "TSKgel SuperH5000", "TSKgel SuperH6000" and "TSKgel SuperH7000" manufactured by Tosoh Corporation were used. The measurement was performed by using an RI detector (HLC8020 manufactured by Tosoh Corporation) under conditions of a column oven temperature of 40° C. and a THF flow rate of 0.6 mL/min to obtain a chromatogram.

GPC Measurement Conditions using Silica-based Column: An apparatus available under the trade name of "HLC-8320GPC" manufactured by Tosoh Corporation was used, THF was used as an eluent, and 50 µL of the sample solution was injected into the apparatus to obtain a chromatogram by using an RI detector under conditions of a column oven temperature of 40° C. and a THF flow rate of 0.5 ml/min. Columns available under the trade names "Zorbax PSM-1000S", "PSM-300S" and "PSM-60S" were connected to one another to be used, and a guard column available under the trade name "DIOL 4.6×12.5 mm 5 micron" was connected to a previous stage of these to be used.

Calculation Method for Modification Percentage: Assuming that the whole peak area was 100, the peak area of the sample was P1 and the peak area of standard polystyrene was P2 in the chromatogram obtained by using the polystyrene-based column, and that the whole peak area was 100, the peak area of the sample was P3 and the peak area of standard polystyrene was P4 in the chromatogram obtained by using the silica-based column, a modification percentage (%) was obtained in accordance with the following formula:

Modification Percentage (%)=$[1-(P2\times P3)/(P1\times P4)]\times 100$ wherein $P1+P2=P3+P4=100$.

(Physical Property 8) Presence of Nitrogen Atom

The measurement was performed similarly to that described in (Physical Property 7), and if the calculated modification percentage was 10% or more, it was determined that the sample had a nitrogen atom. Thus, it was confirmed that each of the modified conjugated diene-based polymers of Examples 1 to 9 and Comparative Examples 2 and 3 had a nitrogen atom, and that the modified conjugated diene-based polymer of Comparative Example 1 did not have a nitrogen atom.

(Physical Property 9) Presence of Silicon Atom

Measurement was performed by using 0.5 g of a modified conjugated diene-based polymer as a sample and using a ultraviolet visible spectrophotometer (trade name "UV-1800" manufactured by Shimadzu Corporation) in accordance with JIS K 0101 44.3.1, and quantitative determination was performed by a molybdenum blue absorptiometry. As a result, if a silicon atom was detected (low detection limit: 10 mass ppm), it was determined that the sample had a silicon atom. Thus, it was confirmed that each of the modified conjugated diene-based polymers of Examples 1 to 9 and Comparative Examples 1 to 3 had a silicon atom.

(Example 1) Modified Conjugated Diene-Based Polymer (Sample 1)

A tank reactor equipped with a stirrer, that is, a tank pressure vessel including a stirrer and a jacket for temperature control, which had an internal volume of 10 L, had a ratio (L/D) between the internal height (L) and the internal diameter (D) of 4.0 and had an inlet in a bottom portion and an outlet in a top portion, was used as a polymerization reactor. 1,3-Butadiene, styrene and n-hexane, from which water had been precedently eliminated, were mixed respectively at rates of 17.9 g/min, 9.8 g/min and 145.3 g/min. In a static mixer provided in the middle of a pipe used for supplying the thus obtained mixed solution to the inlet of the reactor, n-butyllithium for performing a treatment for inactivating a remaining impurity was added at a rate of 0.104 mmol/min to be mixed, and the resultant mixed solution was continuously supplied to the bottom portion of the reactor. In addition, a polar substance of 2,2-bis(2-oxolanyl) propane and a polymerization initiator of n-butyllithium were supplied respectively at rates of 0.0194 g/min and 0.255 mmol/min to the bottom portion of the polymerization reactor in which the mixed solution was vigorously stirred by the stirrer, so as to continuously perform a polymerization reaction. The temperature was controlled so that a temperature of a polymer solution in the outlet in the top portion of the reactor could be 75° C. When the polymerization was sufficiently stabilized, a small amount of the polymerization solution prior to addition of a coupling agent was taken out through the outlet disposed in the top portion of the reactor, an antioxidant (BHT) was added thereto in a ratio of 0.2 g per 100 g of the resultant polymer, the solvent was then removed, and a Mooney viscosity at 110° C. and various molecular weights were measured. Measurement results are shown in Table 1 together with other physical properties.

Next, to the polymer solution flown out through the outlet of the reactor, a coupling agent of bis(3-trimethoxysilylpropyl)-[3-(2,2-dimethoxy-1-aza-2-silacyclopentane)propyl]amine (abbreviated as "A" in the table) having been diluted to 2.74 mmol/L was continuously added in a rate of 0.0425 mmol/min (a n-hexane solution containing 5.2 ppm of water), and the polymer solution to which the coupling agent had thus been added was mixed in passing through the static mixer to cause a coupling reaction. Here, a time up to the addition of the coupling agent to the polymer solution flown out from the outlet of the reactor was 4.8 min, a temperature was 68° C., and a difference between the temperature in the polymerization step and the temperature up to the addition of the modification agent was 7° C. To the polymer solution in which the coupling reaction had been caused, an antioxidant (BHT) was continuously added at a rate of 0.055 g/min (a n-hexane solution) in a ratio of 0.2 g per 100 g of the resultant polymer so as to complete the coupling reaction. At the same time as the addition of the antioxidant, an oil (JOMO Process NC140 manufactured by JX Nippon Mining & Metals Corporation) was continuously added in a ratio of 37.5 g per 100 g of the resultant polymer, and the resultant was mixed by the static mixer. The solvent was removed by the steam stripping to obtain a modified conjugated diene-based polymer (sample 1). The physical properties of the sample 1 are shown in Table 1.

(Example 2) Modified Conjugated Diene-Based Polymer (Sample 2)

A modified conjugated diene-based polymer (sample 2) was obtained in the same manner as in Example 1 except that the coupling agent was changed from bis(3-trimethoxysilylpropyl)-[3-(2,2-dimethoxy-1-aza-2-silacyclopentane)propyl]amine to tris(3-trimethoxysilylpropyl)amine (abbreviated as "B" in the table). The physical properties of the sample 2 are shown in Table 1.

(Example 3) Modified Conjugated Diene-Based Polymer (Sample 3)

A modified conjugated diene-based polymer (sample 3) was obtained in the same manner as in Example 1 except that the coupling agent was changed from bis(3-trimethoxysilylpropyl)-[3-(2,2-dimethoxy-1-aza-2-silacyclopentane)propyl]amine to tris(3-triethoxysilylpropyl)amine (abbreviated as "C" in the table). The physical properties of the sample 3 are shown in Table 1.

(Example 4) Modified Conjugated Diene-Based Polymer (Sample 4)

A modified conjugated diene-based polymer (sample 4) was obtained in the same manner as in Example 1 except that the amount of n-butyllithium added for the treatment was changed to 0.117 mmol/min, that the amount of n-butyllithium added for the polymerization was changed to 0.242 mmol/min, that the coupling agent was changed from bis(3-trimethoxysilylpropyl)-[3-(2,2-dimethoxy-1-aza-2-silacyclopentane)propyl]amine to tris(3-trimethoxysilylpropyl)-[3-(2,2-dimethoxy-1-aza-2-silacyclopentane)propyl]-1,3-propanediamine (abbreviated as "D" in the table), and that the amount of the coupling agent to be added was changed to 0.0302 mmol/min. The physical properties of the sample 4 are shown in Table 1.

(Example 5) Modified Conjugated Diene-Based Polymer (Sample 5)

A modified conjugated diene-based polymer (sample 5) was obtained in the same manner as in Example 1 except that the amount of n-butyllithium added for the treatment was changed to 0.108 mmol/min, that the amount of n-butyllithium added for the polymerization was changed to 0.251 mmol/min, that the coupling agent was changed from bis(3-trimethoxysilylpropyl)-[3-(2,2-dimethoxy-1-aza-2-silacyclopentane)propyl]amine to tris(3-trimethoxysilylpropyl)-[3-(1-methoxy-2-trimethylsilyl-1-sila-2-azacyclopentane)propyl]-1,3-propanediamine (abbreviated as "E" in the table), and that the amount of the coupling agent to be added was changed to 0.0359 mmol/min. The physical properties of the sample 5 are shown in Table 1.

(Example 6) Modified Conjugated Diene-Based Polymer (Sample 6)

A modified conjugated diene-based polymer (sample 6) was obtained in the same manner as in Example 1 except that the amount of n-butyllithium added for the treatment was changed to 0.117 mmol/min, that the amount of n-butyllithium added for the polymerization was changed to 0.242 mmol/min, that the coupling agent was changed from bis(3-trimethoxysilylpropyl)-[3-(2,2-dimethoxy-1-aza-2-silacyclopentane)propyl]amine to tetrakis [3-(2,2-dimethoxy-1-aza-2-silacyclopentane)propyl]-1,3-propanediamine (abbreviated as "F" in the table), and that the amount of the coupling agent to be added was changed to 0.0302 mmol/min. The physical properties of the sample 6 are shown in Table 1.

(Example 7) Modified Conjugated Diene-Based Polymer (Sample 7)

A modified conjugated diene-based polymer (sample 7) was obtained in the same manner as in Example 1 except that the amount of n-butyllithium added for the treatment was changed to 0.117 mmol/min, that the amount of n-butyllithium added for the polymerization was changed to 0.242 mmol/min, that the coupling agent was changed from bis(3-trimethoxysilylpropyl)-[3-(2,2-dimethoxy-1-aza-2-silacyclopentane)propyl]amine to tetrakis (3-trimethoxysilylpropyl)-1,3-propanediamine (abbreviated as "G" in the table), and that the amount of the coupling agent to be added was changed to 0.0302 mmol/min. The physical properties of the sample 7 are shown in Table 1.

(Example 8) Modified Conjugated Diene-Based Polymer (Sample 8)

A modified conjugated diene-based polymer (sample 8) was obtained in the same manner as in Example 1 except that the amount of n-butyllithium added for the treatment was changed to 0.117 mmol/min, that the amount of n-butyllithium added for the polymerization was changed to 0.242 mmol/min, that the coupling agent was changed from bis(3-trimethoxysilylpropyl)-[3-(2,2-dimethoxy-1-aza-2-silacyclopentane)propyl]amine to tetrakis(3-trimethoxysilylpropyl)-1,3-bisaminomethylcyclohexane (abbreviated as "H" in the table), and that the amount of the coupling agent to be added was changed to 0.0302 mmol/min. The physical properties of the sample 8 are shown in Table 1.

(Example 9) Modified Conjugated Diene-Based Polymer (Sample 9)

A modified conjugated diene-based polymer (sample 9) was obtained in the same manner as in Example 1 except that the amount of n-butyllithium added for the treatment was changed to 0.124 mmol/min, that the amount of n-butyllithium added for the polymerization was changed to 0.286 mmol/min, that the amount of the polar substance, 2,2-bis(2-oxolanyl) propane, was changed to 0.0265 g/min, that the coupling agent was changed from bis(3-trimethoxysilylpropyl)-[3-(2,2-dimethoxy-1-aza-2-silacyclopentane)propyl]amine to tris(3-trimethoxysilylpropyl)amine (B), and that the amount of the coupling agent to be added was changed to 0.0477 mmol/min. The physical properties of the sample 9 are shown in Table 1.

(Comparative Example 1) Modified Conjugated Diene-Based Polymer (Sample 10)

A modified conjugated diene-based polymer (sample 10) was obtained in the same manner as in Example 1 except that the amount of n-butyllithium added for the treatment was changed to 0.114 mmol/min, that the amount of n-butyllithium added for the polymerization was changed to 0.248 mmol/min, that the coupling agent was changed from bis(3-trimethoxysilylpropyl)-[3-(2,2-dimethoxy-1-aza-2-silacyclopentane)propyl]amine to bis(trimethoxysilyl)ethane (abbreviated as "I" in the table), and that the amount of the coupling agent to be added was changed to 0.0620 mmol/min. The physical properties of the sample 11 are shown in Table 2.

(Comparative Example 2) Modified Conjugated Diene-Based Polymer (Sample 11)

A modified conjugated diene-based polymer (sample 11) was obtained in the same manner as in Example 1 except that the amount of n-butyllithium added for the treatment was changed to 0.114 mmol/min, that the amount of n-butyllithium added for the polymerization was changed to 0.248 mmol/min, that the coupling agent was changed from bis(3-trimethoxysilylpropyl)-[3-(2,2-dimethoxy-1-aza-2-silacyclopentane)propyl]amine to bis(3-trimethoxysilylpropyl)methylamine (abbreviated as "J" in the table), and that the amount of the coupling agent to be added was changed to 0.0620 mmol/min. The physical properties of the sample 11 are shown in Table 2.

(Comparative Example 3) Branched Modified Diene-Based Polymer (Sample 12)

A temperature-controllable autoclave having an internal volume of 30 L and equipped with a stirrer and a jacket was used as a rector, 17200 g of normal hexane, 1022 g of styrene, 1778 g of 1,3-butadiene and 1.26 g of 2,2-bis(2-oxolanyl) propane used as a polar substance were put in the reactor, and polymerization was started by adding 17.0 mmol of a polymerization initiator of n-butyllithium when the inside temperature of the reactor was 48° C. Immediately after starting the polymerization, the inside temperature of the reactor increased, and when the temperature reached to a peak temperature (83° C.) and was found to start lowering, 3.48 mmol of a coupling agent of bis(3-trimethoxysilylpropyl)methylamine (J) was added thereto, followed by stirring for another 10 minutes. As a polymerization terminator, 17.0 mmol of ethanol was added thereto to terminate the reaction, and thus, a polymer solution containing a modified conjugated diene-based polymer was obtained. To the thus obtained polymer solution, 5.6 g of an antioxidant (BHT) was added in a ratio of 0.2 g per 100 g of the resultant polymer, and the solvent was removed by the steam stripping to obtain a branched modified diene-based polymer (a sample 12). The physical properties of the sample 12 are shown in Table 2.

TABLE 1

| | | | Example 1 | Example 2 | Example 3 | Example 4 | Example 5 | Example 6 |
|---|---|---|---|---|---|---|---|---|
| Modified Conjugated Diene-based Polymer (Sample No.) | | | 1 | 2 | 3 | 4 | 5 | 6 |
| Polymerization Conditions | Butadiene | (g/min) | 17.9 | 17.9 | 17.9 | 17.9 | 17.9 | 17.9 |
| | Styrene | (g/min) | 9.8 | 9.8 | 9.8 | 9.8 | 9.8 | 9.8 |
| | n-Hexane | (g/min) | 145.3 | 145.3 | 145.3 | 145.3 | 145.3 | 145.3 |
| | Polymerization Temperature | (° C.) | 75 | 75 | 75 | 75 | 75 | 75 |
| | n-Butyllithium for treatment | (mmol/min) | 0.104 | 0.104 | 0.104 | 0.117 | 0.108 | 0.117 |
| | n-Butyllithium as polymerization initiator | (mmol/min) | 0.255 | 0.255 | 0.255 | 0.242 | 0.251 | 0.242 |
| | Amount of Polar Substance | (g/min) | 0.0194 | 0.0194 | 0.0194 | 0.0194 | 0.0194 | 0.0194 |
| | Coupling Agent | Type | A | B | C | D | E | F |
| | | Amount (mmol/min) | 0.0425 | 0.0425 | 0.0425 | 0.0302 | 0.0359 | 0.0302 |
| Physical Properties | Conjugated Diene-based Polymer | (Physical Property 3) Weight-Average Molecular Weight ($10^4$ g/mol) | 33.9 | 33.9 | 33.9 | 34.9 | 34.9 | 34.9 |
| | | (Physical Property 3) Number-Average Molecular Weight ($10^4$ g/mol) | 15.7 | 15.7 | 15.7 | 16.9 | 16.9 | 16.9 |
| | | (Physical Property 5) Mooney Viscosity (110° C.) | 44 | 44 | 44 | 46 | 46 | 46 |
| | | (Physical Property 3) Peak Top Molecular Weight $Mp_2$ ($10^4$ g/mol) | 29.9 | 29.9 | 29.9 | 30.6 | 30.6 | 30.6 |
| | | (Physical Property 3) Mw/Mn | 2.16 | 2.16 | 2.16 | 2.07 | 2.07 | 2.07 |
| | | (Physical Property 1) Amount of Bound Styrene (% by mass) | 35 | 35 | 35 | 35 | 35 | 35 |
| | | (Physical Property 2) Amount of Bound Vinyl (Amount of 1,2-bond) (mol %) | 42 | 42 | 42 | 42 | 42 | 42 |
| | Modified Conjugated Diene-based Polymer | (Physical Property 3) Weight-Average Molecular Weight ($10^4$ g/mol) | 67.7 | 71.4 | 64.8 | 84.8 | 77.7 | 86.1 |
| | | (Physical Property 3) Number-Average Molecular Weight ($10^4$ g/mol) | 33.0 | 35.3 | 30.5 | 38.2 | 35.7 | 39.5 |
| | | (Physical Property 3) Peak Top Molecular Weight $Mp_1$ ($10^4$ g/mol) | 72.3 | 74.5 | 70.9 | 95.8 | 85.3 | 97.1 |
| | | (Physical Property 3) Mw/Mn | 2.05 | 2.03 | 2.12 | 2.22 | 2.18 | 2.18 |
| | | (Physical Property 3) $Mp_1/Mp_2$ | 2.42 | 2.49 | 2.37 | 3.13 | 2.79 | 3.17 |
| | | (Physical Property 3) Ratio of Molecular Weight of 2 to 5 million (%) | 1.8 | 2.1 | 1.5 | 4.5 | 3.2 | 4.8 |
| | | Branching Degree | 6 | 6 | 6 | 8 | 7 | 8 |
| | | Number of SiOR Residues | 3 | 3 | 3 | 4 | 4 | 4 |
| | | (Physical Property 4) Shrinking Factor (g) | 0.63 | 0.62 | 0.63 | 0.58 | 0.61 | 0.56 |
| | | (Physical Property 5) Mooney Viscosity of Polymer (100° C.) | 56 | 59 | 52 | 63 | 62 | 64 |
| | | (Physical Property 6) Glass Transition Temperature (° C.) | -24 | -24 | -24 | -24 | -24 | -24 |
| | | (Physical Property 7) Modification Percentage (%) | 79 | 85 | 78 | 83 | 80 | 81 |

TABLE 2

| | | Example 7 | Example 8 | Example 9 | Comparative Example 1 | Comparative Example 2 | Comparative Example 3 |
|---|---|---|---|---|---|---|---|
| Modified Conjugated Diene-based Polymer (Sample No.) | | 7 | 8 | 9 | 10 | 11 | 12 |
| Polymerization Conditions | Butadiene (g/min) | 17.9 | 17.9 | 17.9 | 17.9 | 17.9 | — |
| | Styrene (g/min) | 9.8 | 9.8 | 9.8 | 9.8 | 9.8 | — |
| | n-Hexane (g/min) | 145.3 | 145.3 | 145.3 | 145.3 | 145.3 | — |
| | Polymerization Temperature (° C.) | 75 | 75 | 75 | 75 | 75 | — |
| | n-Butyllithium for treatment (mmol/min) | 0.117 | 0.117 | 0.124 | 0.114 | 0.114 | — |
| | n-Butyllithium as polymerization initiator (mmol/min) | 0.242 | 0.242 | 0.286 | 0.248 | 0.248 | — |
| | Amount of Polar Substance (g/min) | 0.0194 | 0.0194 | 0.0265 | 0.0194 | 0.0194 | — |
| | Coupling Agent Type | G | H | B | I | J | J |
| | Coupling Agent Amount (mmol/min) | 0.0302 | 0.0302 | 0.0477 | 0.0620 | 0.0620 | — |
| Physical Properties | Conjugated Diene-based Polymer (Physical Property 3) Weight-Average Molecular Weight ($10^4$ g/mol) | 35.8 | 35.8 | 25.8 | 34.2 | 34.9 | 26.7 |
| | (Physical Property 3) Number-Average Molecular Weight ($10^4$ g/mol) | 16.6 | 16.6 | 14.2 | 16.0 | 16.9 | 25.3 |
| | (Physical Property 3) Peak Top Molecular Weight Mp$_2$ ($10^4$ g/mol) | 30.9 | 30.9 | 21.7 | 30.5 | 30.6 | 82.8 |
| | (Physical Property 3) Mw/Mn | 2.16 | 2.16 | 1.81 | 2.14 | 2.07 | 1.06 |
| | (Physical Property 1) Amount of Bound Styrene | 35 | 35 | 35 | 34 | 35 | 35 |
| | (Physical Property 2) Amount of Bound Vinyl (Amount of 1,2-bond) (mol %) | 42 | 42 | 40 | 41 | 42 | 40 |
| Modified Conjugated Diene-based Polymer | (Physical Property 3) Weight-Average Molecular Weight ($10^4$ g/mol) | 85.2 | 86.6 | 57.7 | 61.0 | 59.4 | 70.8 |
| | (Physical Property 3) Number-Average Molecular Weight ($10^4$ g/mol) | 38.2 | 39.0 | 35.6 | 32.3 | 30.8 | 55.7 |
| | (Physical Property 3) Peak Top Molecular Weight Mp$_1$ ($10^4$ g/mol) | 96.8 | 99.5 | 55.4 | 58.6 | 56.0 | 82.8 |
| | (Physical Property 3) Mw/Mn | 2.23 | 2.22 | 1.62 | 1.89 | 1.87 | 1.27 |
| | (Physical Property 3) Mp$_1$/Mp$_2$ | 3.13 | 3.22 | 2.56 | 1.92 | 1.83 | 2.88 |
| | (Physical Property 3) Ratio of Molecular Weight of 2 to 5 million (%) | 4.6 | 4.9 | 0.3 | 0.5 | 0.3 | 0 |
| | Branching Degree | 8 | 8 | 6 | 4 | 4 | 4 |
| | Number of SiOR Residues | 4 | 4 | 3 | 2 | 2 | 2 |
| | (Physical Property 4) Shrinking Factor (g) | 0.57 | 0.56 | 0.62 | 0.69 | 0.70 | 0.71 |
| | (Physical Property 5) Mooney Viscosity of Polymer (100° C.) | 65 | 65 | 45 | 52 | 49 | 119 |
| | (Physical Property 6) Glass Transition Temperature (° C.) | −24 | −24 | −23 | −23 | −24 | −25 |
| | (Physical Property 7) Modification Percentage (%) | 80 | 82 | 86 | — | 83 | 78 |

The "branching degree" shown in Tables 1 and 2 refers to the number of branches estimated based on the number of functional groups of and the addition amount of the coupling agent, and can be checked also based on the value of the shrinking factor. The "number of SiOR residues" refers to a value obtained by subtracting the number of SiOR groups reduced through the reaction from the total number of SiOR groups contained in one molecule of the coupling agent. A rubber coupled with the coupling agent (I) used in Comparative Example 1 was not adsorbed to a silica column, and hence the modification percentage could not be calculated.

Examples 10 to 18 and Comparative Examples 4 to 6

The samples 1 to 12 shown in Tables 1 and 2 were used as starting material rubbers, and rubber compositions respectively containing the starting material rubbers were obtained in accordance with the following compositions:

Modified conjugated diene-based polymer (any of the samples 1 to 12): 100 parts by mass (oil removed)

Silica 1 (trade name "Ultrasil 7000GR" manufactured by Evonik Degussa Gmbh, nitrogen adsorption specific surface area: 170 m$^2$/g): 50.0 parts by mass Silica 2 (trade name "Zeosil Premium 200MP" manufactured by Rhodia, nitrogen adsorption specific surface area: 220 m$^2$/g): 25.0 parts by mass Carbon black (trade name "SEAST KH (N339)" manufactured by Tokai Carbon Co., Ltd.): 5.0 parts by mass Silane coupling agent (trade name "Si75" manufactured by Evonik Degussa Gmbh, bis(triethoxysilylpropyl)disulfide): 6.0 parts by mass S-RAE oil (trade name "Process NC140" manufactured by JX Nippon Mining & Metals Corporation): 37.5 parts by mass Zinc oxide: 2.5 parts by mass Stearic acid: 1.0 part by mass Antioxidant (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazyl sulfinamide): 1.7 parts by mass Vulcanization accelerator 2 (diphenylguanidine): 2.0 parts by mass Total: 239.4 parts by mass The above-described materials were kneaded as follows to obtain a rubber composition. A sealed mixer (internal volume: 0.3 L) equipped with a temperature controller was used, and as a first stage of kneading, the starting material rubber (any of the samples 1 to 12), the fillers (the silica 1, the silica 2 and the carbon black), the silane coupling agent, the process oil, the zinc oxide and the stearic acid were kneaded under conditions of a filling rate of 65% and a rotator rotational speed of 30 to 50 rpm. Here, the temperature of the sealed mixer was controlled to obtain the rubber composition (compound) at a discharging temperature of 155 to 160° C.

Next, as a second stage of the kneading, the compound obtained as described above was cooled to room temperature, the antioxidant was added thereto, and the resultant was kneaded again to improve the dispersibility of the silica. Also in this case, the discharging temperature for the compound was adjusted to 155 to 160° C. by the temperature control of the mixer. After the cooling, as a third stage of the kneading, sulfur and the vulcanization accelerators 1 and 2 were added to and mixed with the resultant compound by an open roll set to 70° C. Thereafter, the resultant was molded and vulcanized at 160° C. for 20 minutes by a vulcanizing press. The rubber composition was evaluated before and after the vulcanization. Specifically, the evaluation was performed by methods described below. Results are shown in Tables 3 and 4.

(Evaluation 1) Mooney Viscosity of Compound

The compound obtained as described above after the second stage of the kneading and before the third stage of the kneading was used as a sample, and the viscosity was measured using a Mooney viscometer in accordance with JIS K6300-1 after preheating the sample at 130° C. for 1 minute, and after rotating a rotor for 4 minutes at 2 rpm. Results are shown as indexes obtained assuming that the result of Comparative Example 4 was 100. A smaller index indicates better workability.

(Evaluation 2) Viscoelasticity Parameter

A viscoelasticity testing machine "ARES" manufactured by Rheometric Scientific, Inc. was used to measure a viscoelasticity parameter in a torsional mode. Each measurement value was shown as an index obtained assuming that the result of the rubber composition of Comparative Example 4 was 100. A tan δ measured at 0° C. at a frequency of 10 Hz and strain of 1% was used as an index of the wet grip characteristics. A larger index indicates better wet grip characteristics. Besides, a tan δ measured at 50° C. at a frequency of 10 Hz and strain of 3% was used as an index of fuel efficiency. A smaller index indicates higher fuel efficiency.

(Evaluation 3) Tensile Strength and Tensile Elongation

The tensile strength and the tensile elongation were measured in accordance with a tensile test of JIS K6251, and results are shown as indexes obtained assuming that the result of Comparative Example 4 was 100. A larger index indicates better tensile strength and better tensile elongation.

(Evaluation 4) Abrasion Resistance

An Acron abrasion tester (manufactured by Yasuda Seiki Seisakusho, Ltd.) was used to measure an abrasion amount through 1000 rotations at a load of 44.4 N in accordance with JIS K6264-2, and results are shown as indexes obtained assuming that the result of Comparative Example 4 was 100. A larger index indicates better abrasion resistance.

TABLE 3

|  |  | Example 10 | Example 11 | Example 12 | Example 13 | Example 14 | Example 15 |
|---|---|---|---|---|---|---|---|
| Modified Diene-based Polymer (Sample No.) | | 1 | 2 | 3 | 4 | 5 | 6 |
| (Physical Property 4) Mooney Viscosity (100° C.) of Modified Diene-based Polymer | | 56 | 60 | 52 | 63 | 62 | 64 |
| (Evaluation 1) Mooney Viscosity (130° C.) of Compound | index | 94 | 91 | 88 | 89 | 103 | 92 |
| Physical Properties of Vulcanizate | (Evaluation 2) 50° C. tanδ (strain 3%) index | 83 | 82 | 85 | 76 | 80 | 74 |
| | (Evaluation 2) 0° C. tanδ (strain 1%) index | 122 | 127 | 118 | 130 | 128 | 129 |
| | (Evaluation 3) Tensile Strength index | 100 | 102 | 100 | 102 | 103 | 101 |

TABLE 3-continued

|  |  | Example 10 | Example 11 | Example 12 | Example 13 | Example 14 | Example 15 |
|---|---|---|---|---|---|---|---|
| (Evaluation 3) Tensile Elongation | index | 104 | 101 | 103 | 99 | 105 | 102 |
| (Evaluation 4) Abrasion Resistance | index | 110 | 113 | 108 | 114 | 113 | 118 |

TABLE 4

|  |  |  | Example 16 | Example 17 | Example 18 | Comparative Example 4 | Comparative Example 5 | Comparative Example 6 |
|---|---|---|---|---|---|---|---|---|
| Modified Diene-based Polymer (Sample No.) | | | 7 | 8 | 9 | 10 | 11 | 12 |
| (Physical Property 4) Mooney Viscosity (100° C.) of Modified Diene-based Polymer | | | 64 | 65 | 45 | 52 | 49 | 119 |
| (Evaluation 1) Mooney Viscosity (130° C.) of Compound | | index | 89 | 89 | 66 | 100 | 92 | 118 |
| Physical Properties of Vulcanizate | (Evaluation 2) 50° C. tanδ (strain 3%) | index | 74 | 73 | 72 | 100 | 87 | 89 |
| | (Evaluation 2) 0° C. tanδ (strain 1%) | index | 133 | 130 | 135 | 100 | 103 | 109 |
| | (Evaluation 3) Tensile Strength | index | 101 | 105 | 96 | 100 | 104 | 102 |
| | (Evaluation 3) Tensile Elongation | index | 98 | 101 | 95 | 100 | 102 | 92 |
| | (Evaluation 4) Abrasion Resistance | index | 116 | 117 | 106 | 100 | 101 | 88 |

As shown in Tables 3 and 4, it was confirmed at least that the modified conjugated diene-based polymers of Examples 10 to 18 are superior to the modified conjugated diene-based polymers of Comparative Examples 4 to 6 in the balance between the wet grip characteristics and the fuel efficiency obtained when in the form of a vulcanizate and in the abrasion resistance. Besides, it was also confirmed that the Mooney viscosity of the compound obtained when used for obtaining a vulcanizate is low and good workability is exhibited. Furthermore, it was also confirmed that these polymers have practically sufficient fracture strength obtained when in the form of a vulcanizate.

This application is based upon the prior Japanese patent application (Japanese Patent Application No. 2015-031098), filed to the Japanese Patent Office on Feb. 19, 2015, the entire contents of which are incorporated herein by reference.

INDUSTRIAL APPLICABILITY

A modified conjugated diene-based polymer according to the present invention is industrially applicable in the fields of tire treads, vehicle interiors and exteriors, anti-vibration rubbers, belts, shoes, foams and various industrial products.

The invention claimed is:

1. A branched modified conjugated diene-based polymer having a weight-average molecular weight of $50 \times 10^4$ or more and $300 \times 10^4$ or less, comprising:
 a modified conjugated diene-based polymer component having a molecular weight of $200 \times 10^4$ or more and $500 \times 10^4$ or less in an amount of 1.0% by mass or more and 30% by mass or less based on a total amount of the branched modified conjugated diene-based polymer; a silicon atom; and
 a shrinking factor (g') of less than 0.64.

2. The branched modified conjugated diene-based polymer according to claim 1, further comprising a nitrogen atom.

3. The branched modified conjugated diene-based polymer according to claim 1, wherein the weight-average molecular weight is $150 \times 10^4$ or less.

4. The branched modified conjugated diene-based polymer according to claim 1, wherein a branching degree is 5 or more.

5. The branched modified conjugated diene-based polymer according to claim 4, wherein the branching degree is 6 or more.

6. The branched modified conjugated diene-based polymer according to claim 4, having one or more of coupling residues and conjugated diene-based polymer chains bonded to the coupling residues,
 wherein five or more of the conjugated diene-based polymer chains are bonded to one of the coupling residues.

7. The branched modified conjugated diene-based polymer according to claim 4, having one or more of coupling residues and conjugated diene-based polymer chains bonded to the coupling residues, wherein six or more of the conjugated diene-based polymer chains are bonded to one of the coupling residues.

8. The branched modified conjugated diene-based polymer according to claim 6, wherein at least one silicon atom contained in the coupling residues is an alkoxysilyl group or a silanol group having 1 to 20 carbon atoms.

9. The branched modified conjugated diene-based polymer according to claim 1, represented by following general formula (I):

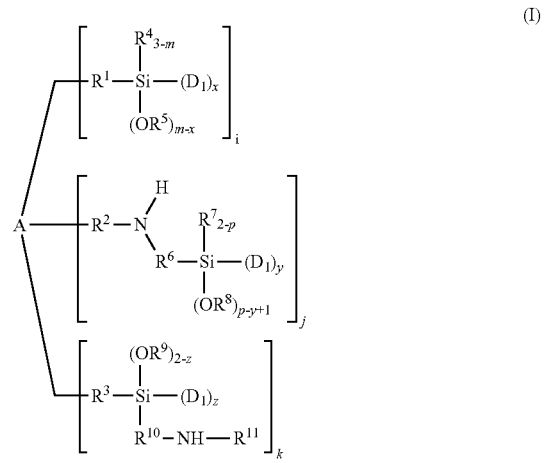

wherein $D_1$ represents a diene-based polymer chain;

$R^1$ to $R^3$ each independently represent a single bond or an alkylene group having 1 to 20 carbon atoms;

$R^4$ and $R^7$ each independently represent an alkyl group having 1 to 20 carbon atoms;

$R^5$, $R^8$ and $R^9$ each independently represent a hydrogen atom or an alkyl group having 1 to 20 carbon atoms;

$R^6$ and $R^{10}$ each independently represent an alkylene group having 1 to 20 carbon atoms;

$R^{11}$ represents a hydrogen atom or an alkyl group having 1 to 20 carbon atoms;

m and x each independently represent an integer of 1 to 3, and x≤m;

p represents 1 or 2, y represents an integer of 1 to 3, and y≤(p+1);

z represents an integer of 1 or 2;

each of $D_1$, $R^1$ to $R^{11}$, m, p, x, y and z, if present in a plural number, is respectively independent and may be the same as or different from each other;

i represents an integer of 0 to 6, j represents an integer of 0 to 6, k represents an integer of 0 to 6, (i+j+k) is an integer of 3 to 10; ((x×i)+(y×j)+(z×k)) is an integer of 5 to 30; and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

10. The branched modified conjugated diene-based polymer according to claim 9, wherein A in formula (I) is represented by any one of following general formulas (II) to (V):

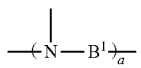
(II)

wherein $B^1$ represents a single bond or a hydrocarbon group having 1 to 20 carbon atoms; a represents an integer of 1 to 10; and $B^1$, if present in a plural number, is respectively independent;

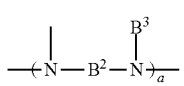
(III)

wherein $B^2$ represents a single bond or a hydrocarbon group having 1 to 20 carbon atoms; $B^3$ represents an alkyl group having 1 to 20 carbon atoms; a represents an integer of 1 to 10; and each of $B^2$ and $B^3$, if present in a plural number, is respectively independent;

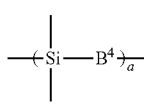
(IV)

wherein $B^4$ represents a single bond or a hydrocarbon group having 1 to 20 carbon atoms; a represents an integer of 1 to 10; and $B^4$, if present in a plural number, is respectively independent; and

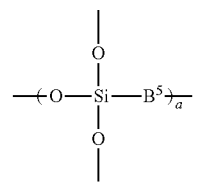
(V)

wherein $B^5$ represents a single bond or a hydrocarbon group having 1 to 20 carbon atoms; a represents an integer of 1 to 10; $B^5$, if present in a plural number, is respectively independent.

11. A method for producing the branched modified conjugated diene-based polymer according to claim 1, comprising:

polymerizing at least a conjugated diene compound using an organomonolithium compound as a polymerization initiator to obtain a conjugated diene-based polymer; and reacting the conjugated diene-based polymer with a compound represented by the following general formula VI);

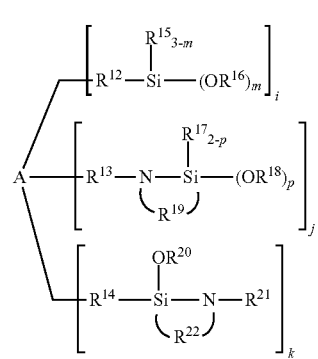
(VI)

wherein $R^{12}$ to $R^{14}$ each independently represent a single bond or an alkylene group having 1 to 20 carbon atoms;

$R^{15}$ to $R^{18}$ and $R^{20}$ each independently represent an alkyl group having 1 to 20 carbon atoms;

$R^{19}$ and $R^{22}$ each independently represent an alkylene group having 1 to 20 carbon atoms;

$R^{21}$ represents an alkyl group or a trialkylsilyl group having 1 to 20 carbon atoms;

m represents an integer of 1 to 3;

p represents 1 or 2; each of $R^{12}$ to $R^{22}$, m and p, if present in a plural number, is respectively independent, and may be the same as or different from each other;

i represents an integer of 0 to 6, j represents an integer of 0 to 6, k represents an integer of 0 to 6, (i+j+k) is an integer of 3 to 10; and A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

12. The method for producing the branched modified conjugated diene-based polymer according to claim 11, wherein A in formula (VI) is represented by any one of following general formulas (II) to (V):

(II)

wherein $B^1$ represents a single bond or a hydrocarbon group having 1 to 20 carbon atoms; a represents an integer of 1 to 10; and $B^1$, if present in a plural number, is respectively independent;

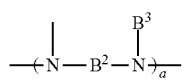

(III)

wherein $B^2$ represents a single bond or a hydrocarbon group having 1 to 20 carbon atoms; $B^3$ represents an alkyl group having 1 to 20 carbon atoms; a represents an integer of 1 to 10; and each of $B^2$ and $B^3$, if present in a plural number, is respectively independent;

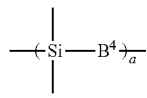

(IV)

wherein $B^4$ represents a single bond or a hydrocarbon group having 1 to 20 carbon atoms; a represents an integer of 1 to 10; and $B^4$, if present in a plural number, is respectively independent; and

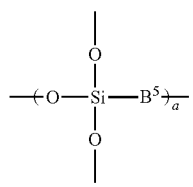

(V)

wherein $B^5$ represents a single bond or a hydrocarbon group having 1 to 20 carbon atoms; a represents an integer of 1 to 10; and $B^5$, if present in a plural number, is respectively independent.

13. The method for producing the branched modified conjugated diene-based polymer according to claim 12, wherein A in formula (VI) is represented by formula (II) or (III), wherein k represents 0 (zero).

14. The method for producing the branched modified conjugated diene-based polymer according to claim 12, wherein A in formula (VI) is represented by formula (II) or (III), wherein k represents 0 (zero), and a in formula (II) or (III) represents an integer of 2 to 10.

15. The method for producing the branched modified conjugated diene-based polymer according to claim 11, wherein the organomonolithium compound is an alkyl lithium compound having a substituted amino group or dialkylamino lithium.

16. The method for producing the branched modified conjugated diene-based polymer according to claim 11, wherein the organomonolithium compound is an alkyl lithium compound.

17. A rubber composition, comprising:
a rubber component and
a filler in an amount of 5.0 parts by mass or more and 150 parts by mass based on 100 parts by mass of the rubber component,
wherein the rubber component comprises the branched modified conjugated diene-based polymer according to claim 1 in an amount of 10% by mass or more based on a total amount of the rubber component.

18. A tire comprising the rubber composition according to claim 17.

* * * * *